US011132590B2

(12) United States Patent
Brent et al.

(10) Patent No.: US 11,132,590 B2
(45) Date of Patent: Sep. 28, 2021

(54) AUGMENTED CAMERA FOR IMPROVED SPATIAL LOCALIZATION AND SPATIAL ORIENTATION DETERMINATION

(71) Applicant: IAS Machine, LLC, Newcastle, WA (US)

(72) Inventors: Roger Brent, Seattle, WA (US); Jamie Douglas Tremaine, Toronto (CA)

(73) Assignee: LABLIGHTAR INC., Seattle, WA (US)

( * ) Notice: Subject to any disclaimer, the term of this patent is extended or adjusted under 35 U.S.C. 154(b) by 0 days.

(21) Appl. No.: 17/119,531

(22) Filed: Dec. 11, 2020

(65) Prior Publication Data

US 2021/0182639 A1 Jun. 17, 2021

Related U.S. Application Data

(60) Provisional application No. 62/947,445, filed on Dec. 12, 2019.

(51) Int. Cl.
*G06K 19/06* (2006.01)
*G09G 5/397* (2006.01)
*G06T 19/00* (2011.01)
*G06T 7/73* (2017.01)

(52) U.S. Cl.
CPC ......... *G06K 19/06046* (2013.01); *G06T 7/73* (2017.01); *G06T 19/006* (2013.01); *G09G 5/397* (2013.01)

(58) Field of Classification Search
CPC .............. G06F 2111/18; G06F 3/0481; G06F 3/04817; G06F 9/4443; G06F 3/04847; G06F 11/3664; G06F 13/10; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| 4,804,949 | A | 2/1989 | Faulkerson |
| 7,477,993 | B2 | 1/2009 | Sunshine et al. |
| 9,418,416 | B2 | 8/2016 | Milne et al. |
| 10,467,534 | B1 | 11/2019 | Brent et al. |
| 10,706,626 | B1 | 7/2020 | Brent et al. |

(Continued)

FOREIGN PATENT DOCUMENTS

| WO | 2016169871 A1 | 10/2016 |
| WO | 2018106289 A1 | 6/2018 |

OTHER PUBLICATIONS

U.S. Appl. No. 17/179,208, filed Feb. 21, 2018, Roger Brent.

(Continued)

*Primary Examiner* — Todd Buttram
(74) *Attorney, Agent, or Firm* — Rowan TELS LLC

(57) ABSTRACT

An augmented reality system for procedural guidance identifies a fiducial marker object in a frame of a first field of view generated by a camera, determines a pose of the fiducial marker object, applies the fiducial marker pose to generate a first transformation between a first coordinate system of the fiducial marker object and a second coordinate system of the camera, and applies a pose of a headset to determine a second transformation between the first coordinate system and a third coordinate system of the headset.

20 Claims, 12 Drawing Sheets

(56) References Cited

U.S. PATENT DOCUMENTS

| | | | |
|---|---|---|---|
| 2005/0010106 | A1 | 1/2005 | Lang et al. |
| 2007/0211928 | A1 | 9/2007 | Weng et al. |
| 2011/0187746 | A1 | 8/2011 | Suto et al. |
| 2012/0184840 | A1 | 7/2012 | Najarian et al. |
| 2013/0010068 | A1 | 1/2013 | Tieman et al. |
| 2013/0071875 | A1 | 3/2013 | Zemer et al. |
| 2015/0342551 | A1 | 12/2015 | Lavi et al. |
| 2016/0203648 | A1 | 7/2016 | Bilbrey et al. |
| 2018/0204160 | A1 | 7/2018 | Chehade et al. |
| 2019/0228269 | A1 | 7/2019 | Brent et al. |

OTHER PUBLICATIONS

PCT_ISR dated Feb. 8, 2021.
PCT_WO dated Feb. 8, 2021.
Kloss et. al_"LIGGGHTS and CFDEM coupling—Modelling of macroscopic particle processes based on LAMMPS technology", 2013 (Year: 2013).

AUGMENTED CAMERA FOR IMPROVED SPATIAL LOCALIZATION AND SPATIAL ORIENTATION DETERMINATION

CROSS-REFERENCE TO RELATED APPLICATIONS

This application claims priority and benefit under 35 USC 119(e) of U.S. provisional application Ser. No. 62/947,445, titled "AUGMENTED CAMERA FOR IMPROVED SPATIAL LOCALIZATION AND SPATIAL ORIENTATION DETERMINATION", filed on Dec. 12, 2019, the contents of which are incorporated herein by reference in their entirety.

BACKGROUND

Augmented reality involves the superimposition of digital information such as text, images, and virtual objects in the user's field of view, or sounds in the user's auditory field. Recent advancements in the field of augmented reality hardware include the HoloLens 1 and HoloLens 2 by Microsoft and the Magic Leap One and the recently marketed Nreal Light. As used here, the term "augmented reality", or "AR" refers to technology that superimposes computer-generated visual objects or other annotations on a user's field of view ("FoV") and (optionally) that injects computer-generated audio into the user's field of hearing ("FoH"), thus providing a composite experience.

Augmented reality shows promise for improving many kinds of work in which people interact with physical objects, for example lab work, which requires the worker to operate equipment, work with materials, follow procedures, and collect and record information. To improve this type of "procedural work" AR technology should provide identification of, and spatially precise estimation of, location and orientation (attitude or pose) of objects in the physical world to enable better localization and orientation of virtual objects than provided by these existing devices. A current limitation is that the object localization and identification (semantic precision) provided by existing augmented reality systems is not accurate enough for use with a broad range of manual procedures, including delicate laboratory tasks, machine operation and repair, and product assembly. Another limitation is that conventional AR devices do not currently support object identification and determination of object pose at the platform level. Furthermore, conventional devices have no platform-level means of developing a common coordinate frame within the working volume or work environment which may be shared by other headsets and other IOT devices.

These same limitations are found in conventional virtual reality systems in those instances where applications in virtual reality need to localize and orient objects in the physical world. "Virtual reality", or "VR", refers to the computer-generated simulation of a three-dimensional environment that can be interacted with in a seemingly real or physical way by a person using special electronic equipment, such as a headset with a display and gloves fitted with sensors. Virtual reality system which have visual or auditory elements which correspond to real-world objects are known as "mixed reality", or "MR". Collectively AR, VR, and MR are known as extended reality ("XR"). Unless otherwise indicated, the term "augmented reality" or "AR" herein should be understood to refer to any extended reality technology.

There is a commercial need to enhance the abilities of extended reality systems to (1) identify physical objects, and (2) determine the location and orientation of physical objects, in order to more precisely position and orient virtual objects and augmentations, and to localize sounds within the operator's augmented or virtual environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
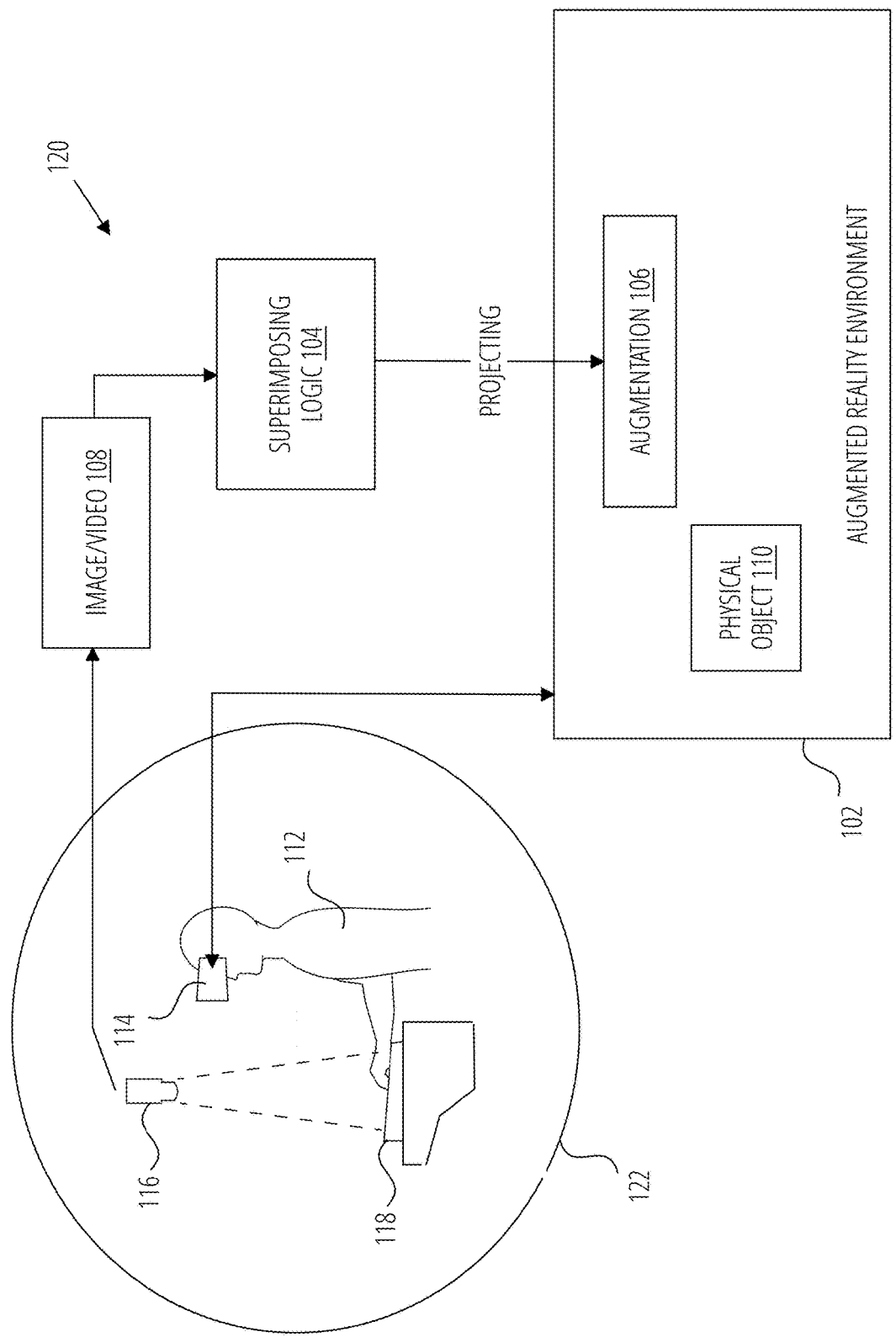
FIG. 1 depicts an embodiment of a work environment 120.

Disclosed herein are embodiments of a camera-type device, referred to herein as an augmented camera system or "augmented camera", that supplements the capability of augmented reality or virtual reality systems to perform improved-precision localization and orientation of objects and correct pose and orientation when multiple operators are active in the work environment.

The augmented camera system enables improved localization of physical objects such that corresponding virtual objects, sounds, and/or augmentations, and other virtual objects, sounds, or augmentations, may be accurately localized and identified in the operator's visual field. The augmented camera utilizes a range sensing component and an associated processor that communicates with an augmented reality or virtual reality headset, for example via WiFi, Bluetooth, or a hardwired connection. The augmented camera includes a range-sensing component (also referred to herein as a "depth sensor"). This component may for example be a time-of-flight sensor, structured light sensor, or stereo image sensor(s) or other means known in the art for determining distance to objects from camera feeds, such as comparison of two successive feeds. The system includes logic to utilize the output of this component for precise identification, localization, attitude (pose) determination, and tracking of objects and sounds in the headset user's workspace.

The augmented camera comprises an onboard processor (one or more CPU, GPU, or other specialized processors) to carry out image analysis. Image analysis may be carried out using any number of known techniques, for example using a neural network (NN) and/or heuristic, statistical, or deterministic techniques. In one implementation a single augmented camera is placed in a fixed position to collect information from a fixed field of view that defines a subset of the spatial volume seen by the operator wearing a headset. Within that fixed field of view, spatial localization and spatial orientation estimation of physical objects is performed. The augmented camera's field of view is referred to herein as the "workspace" but the coordinate frame extends beyond that, to cover the whole room or "work environment". The augmented camera may for example be positioned above (in a downward-facing orientation) a lab bench in the area of which the operator conducts procedural work. Other implementations may utilize multiple augmented cameras to provide independent or overlapping zones of enhanced spatial accuracy and precision.

In some embodiments, the augmented camera provides advanced processing capabilities and projects information regarding the spatial location and spatial orientation of objects and/or sounds directly into the coordinate frame of the operator's augmented reality or virtual reality headset. In other embodiments, the operator's headset or an auxiliary device or devices carry out a majority of the processing and the augmented camera is limited to outputting raw sensor data to said external device(s). In some embodiments establishment of the headset's coordinate frame, registration of the augmented camera, and/or registration of the headset, is aided by the use of a ChArUco card or other fiducial marker.

The disclosed mechanisms have utility for procedural guidance systems that guide and instruct operators with augmented/virtual reality headsets through the completion of physical tasks or procedures. Procedural guidance may be presented in the form of instructional text, graphical information, localized sounds, and/or other augmentations in the operator's field of view and field of hearing as perceived through the augmented reality headset. Procedural guidance may be "open loop"—passively instructing the operator—or "closed loop", directing actions by the operator and/or adjusting content based on feedback from the operator's actions.

Current headsets are limited to sensing the large-scale environment and large objects (large relative to the field of view) and do not have sufficient sensor precision to map, identify, localize, determine orientation, and track smaller physical objects in the work environment accurately. Similar constraints prevent them from localizing and orienting virtual objects and localizing virtual sounds with respect to those physical objects. Although such headsets may be directed at objects on the workspace, they are unable to distinguish or display objects with the spatial location and spatial orientation precision that current and next-generation procedural guidance systems may utilize. It is also challenging to coordinate multiple headsets.

The augmented cameras disclosed herein enable the mapping and localization of physical objects in the physical workspace by utilizing an auxiliary system that includes a depth sensor and additional onboard (implemented in the augmented camera) or externally-executed algorithms. An augmented camera with a depth sensor performs the functions of a camera (e.g., capturing video or still images) but also provides measures of distance to pixels in said video or images. This range information may be processed into a "depth map" (also called a "range image" or "RGBD image"). In other implementations, sensor inputs may be processed into other forms of intermediate data including image bitmaps, filtered images, point clouds, or feature geometry.

At present, three primary types of depth sensors, namely (1) structured light, (2) time-of-flight (ToF), and (3) stereo imaging devices dominate the marketplace. Depth sensors include conventional structured-light depth sensors, ToF sensors, stereo imaging devices, as well as LIDAR, synthetic aperture radar, time-of-flight, and other range imaging technologies known in the art.

The augmented camera or an auxiliary system interprets the "depth feed" (the real-time series of depth maps) or other real-time series of intermediate data to map the environment, to identify objects, to determine object poses, to track objects, and to accurately localize virtual objects and sounds. In this sense, the augmented camera and/or auxiliary devices may be thought of as functioning as an "oracle" which provides the spatial location and spatial orientation of objects for one or more headsets or other clients depicting the workspace.

The following description refers to headsets as the devices that depict the virtual reality or augmented reality scene to the operator. It should be understood that devices other than headsets may be utilized for this purpose, such as mobile phones, tablets, desktop, or laptop computers running native software or web browsers, etc.

In some implementations, one headset (or a fixed position camera) may act as a "master" device that dictates the coordinate frame that other headsets utilize and/or further dictates the pace of the procedure to carry out.

Vision Pipeline

A deterministic machine vision pipeline may be implemented to discern objects from the depth map feed or other intermediate data feed. The pipeline in one embodiment is implemented in the augmented camera. This provides potential improvements in relation to techniques such as neural networks, for example:

1. efficiency—the algorithms are computationally efficient in comparison to neural networks;
2. robustness—decisions on handling failures may be implemented at any given stage of the pipeline;
3. predictability—the behavior of the algorithms may demonstrate improved consistency;
4. knowability—the behavior of the algorithms is readily understandable to those of ordinary skill in the art;
5. adaptability—there is no need to train the system for every new object to be recognized; and
6. modifiability—system behavior may be modified without re-training.

Execution efficiency is a design consideration for headsets with constrained onboard computational resources, and operators are sensitive to the latency between the movement of a real object and the movement of any associated virtual objects.

The vision pipeline proceeds in three stages: (1) image segmentation and object detection, (2) object tracking and persistence, and (3) identification. There are numerous methodologies to complete each of these steps.

Image Segmentation and Object Detection

One embodiment performs image segmentation by removing background information from captured frames, thereby leaving foreground objects remaining for later stage analysis. This embodiment detects the plane of a ChArUco or another fiducial and uses the ChArUco as the basis for determining the coordinate frame for the headset. The ChArUco need not be used for plane detection, but rather for defining the shared coordinate frame. Once the shared coordinate frame is detected, the input depth and image streams may be orthonormalized with a specific quantization to the shared coordinate frame. This may provide coordinate regularization and normalization which may be useful in facilitating the identification step. Plane detection may be enhanced further by extending to one of the following:

- simple plane detection: assumes that the depth sensor line-of-sight is perpendicular to the plane and assumes a clear workspace or involves the user selecting plane points;
- angled plane detection: detects an angled plane from three points, assumes a clear workspace or involves the user selecting plane points;
- accurate angled plane detection: regresses an angled plane from more than three points, assumes a clear workspace or involves the user selecting plane points;
- robust plane detection using random sample consensus ("RANSAC") or another robust estimation method.

When the background is not a simple plane but is instead an uneven surface, a box or another complex object, the box or other object may be detected based on a fiducial, template, marker-based approach, statistical method, neural network, or other detection method known in the art, and then removed from the image frames. In the case of a box or other multi-planar object, the base plane as well as wall planes of the object may be detected using any of the above-mentioned plane detection methods and removed. In the case of an uneven surface, an initial capture of the surface may be used as the background, and objects may be promoted to the foreground upon movement. Object detection proceeds after the background removal step. One implementation uses a contour detection approach for object detection. Once the background is removed, the interior and exterior contours of objects are detected. This may also be carried out using a blob detection or "connected components" approach in which, once the background has been removed, contiguous non-background pixels are grouped according to their connectivity. Graph-based connectivity methods based on depth, color, or both could also be used.

Feature Extraction

After objects are segmented, object features may be extracted. Feature extraction may not be utilized in some embodiments. One implementation uses object center points and minimum bounding rectangular prisms (fitted oriented rectangle and height). Additional features could be used, such as:

- volume centroid (based on height data);
- Hu moments (based on height data);
- shape (internal and external contours);
- image of object top;
- 2D keypoints of the image of the top of the object;
- 3D keypoints; and
- texture (spatial or visual).

Object Tracking and Persistence

One implementation performs object tracking by analyzing each frame independently and then matching the objects in each frame. This approach may apply both heuristic restriction (known limits for inter-frame object movement limit tracking possibilities) and brute force feature matching in which in every frame, the features of previously visible objects are matched against currently visible objects. Feature matching may also be implemented using a FLANN (Fast Library for Approximate Nearest-Neighbors)-based matcher, or another efficient matching technique as known in the art.

In other implementations advanced matching approaches may be applied such as a particle filter, or sparse or dense (keypoint-based) optical flow tracking. Optical flow tracking uses 2D (RGB data or depth data) or 3D (depth data) optical flow to track objects identified in the previous frame to their current position in the current frame.

Object Identification

One approach identifies objects using a feature value range. Acceptable parameter value ranges for objects are recorded. If the features of an object in the scene fall within the acceptable value range the object is successfully identified. This approach may be extended with interactive user identification, a neural network classifier, a statistical network classifier, or a combination of these approaches. With user identification, the system interactively queries the user to identify each object or each unknown object. A statistical feature classifier functions similarly to the feature value range approach except using probability distributions for the feature values and using a maximum likelihood estimator, Support Vector Machine, or other statistical classification technique to identify/classify objects.

These techniques could be combined using neural networks or statistical techniques such as boosting. One or more sections of the vision pipeline may be replaced with either separate or integrated neural networks. Neural network training could occur over neural network and non-neural network components of the pipeline by using differentiable algorithms for any non-neural network component.

Intrinsic Calibration

[key quantitative attributes of?] Conventional digital cameras comprise a focal length, physical sensor size, sensor size in pixels, and aspect ratio, which together determine the mapping between the object measurements in real units and the size of the projection of the object image in pixels. These factors determine the x-dimension and y-dimension scale factors. No digital camera lens axis is perfectly centered on the sensor, and, to a first approximation, the distortions introduced during manufacture] mean that no two cameras operate exactly alike. The lack of perfect centering introduces shifts in the x and y pixel coordinates. The x and y shifts and x and y scale factors may be combined to produce a matrix that enables the projection of real-world coordinates X, Y (denoted in real units) into projective camera coordinates x, y (denoted in pixels). This matrix is known in the art as the "projection matrix" or the "camera matrix." The projection matrix may be determined using an object of known dimensions and comparing its known dimensions in real units to the measurements of the object image in pixels, enabling calibration of individual cameras.

No camera lens is perfect, nor is any digital camera sensor. The imperfections inherent in camera optics introduce different forms of distortion, such as radial distortion, axial distortion, chromatic aberration, and spherical aberration. These distortions are typically corrected to map captured images to accurate real-world coordinates of objects. There are a number of different mathematical models of camera distortion (e.g., descending-accuracy polynomial series models) that are well known in the art and that account for different distortions with different degrees of accuracy. These distortion models have parameters that can be regressed empirically by using objects with known measurements such as a planar checkerboard in different poses and by observing the difference between the measured object coordinates and the coordinates expected in the absence of distortion.

The generation of both the projection matrix and the distortion parameters is known in the art as "intrinsic calibration." Intrinsic calibrations are static for the lifetime of the sensor (barring any mechanical deviation in the sensor or the optics) and as such, an intrinsic calibration need only be performed once. In one embodiment the mapping of projective coordinates to real coordinates utilizes an intrinsic calibration involving the augmented camera and the camera in one or more headsets. Intrinsic calibration is well-known in the art, and the disclosed mechanisms may utilize known techniques and logic libraries to perform intrinsic calibration.

Extrinsic Calibration

Determination of the mapping between the coordinate frame used by any two cameras or sensors, such an external camera and the coordinate frame used by a headset, is known in the art as "extrinsic calibration."

Determining the extrinsic calibration between the augmented camera and one or more headsets may be accomplished in a number of ways, for example:
1. the augmented camera may recognize the headset(s);
2. the headset(s) may recognize the augmented camera; or
3. the augmented camera and headsets may both recognize another object.

In one embodiment an environmental object is utilized specifically for extrinsic calibration. ChArUco boards are checkerboards with ArUco markers in each square. An ArUco marker is a synthetic square marker comprising a wide black border and an inner binary matrix that determines its identifier. The black border facilitates its fast detection in the image and the binary matrix enables its identification and the application of error detection and correction techniques. The marker size determines the size of the internal matrix. The boards may be printed for example on paper or on paper with adhesive backing, such as post-it notes, and adhered to a planar surface, or onto stiffer planar objects such as drink coasters that may be positioned on a surface.

The known grid size of the checkerboard is readily detected. As the lines of the checkerboard are spread across many pixels, their positions (and therefore the positions of their intersections—the corner points) may be regressed to achieve sub-pixel accuracy. The ArUco markers are black and white and are designed to be rapidly detectable using conventional image processing algorithms. The uniqueness of the ArUco markers in each square of the ChArUco checkerboard enables the orientation of the board to be determined which in turn enables the determination of a single, unique origin point and a coordinate frame. The uniqueness of the ArUco markers also allows for the ability to create and differentiate between multiple unique boards, which could be used to identify different workspaces.

Once the augmented camera and the headsets have each recognized the position of the ChArUco basis frame, the mapping between the coordinate system of the augmented camera and the headsets is determined. In some implementations, the augmented camera is a workspace object oracle for the headsets that communicate the positions of the workspace objects for display by the headsets. The coordinates may be communicated between the augmented camera and the headset in either the augmented camera coordinate frame, the headset coordinate frame, or an independent coordinate frame.

One implementation utilizes an independent coordinate frame, specifically, the coordinate frame of a ChArUco board. Using the ChArUco coordinate frame basis has the advantage of allowing each device in the system (camera, headset, etc.) to be responsible for its own mapping to the ChArUco basis frame. The augmented camera is often fixed in location and field of view, and may image the ChArUco board momentarily to establish the extrinsic calibration. Inside-out/SLAM tracking provides an extrinsic calibration between the headset's initial position (initial headset basis) and the current position of the headset ("$E_{initial\_to\_current}$"). $E_{initial\_to\_current}$ calibration is updated continuously by the headset's inside-out tracker. Once the ChArUco board is recognized by the headset, an extrinsic calibration may be performed ("$E_{current\_to\_ChArUco}$"). $E_{initial\_to\_current} * E_{current\_to\_ChArUco}$ gives $E_{initial\_to\_ChArUco}$, which may be applied to transform coordinates back and forth between the headset's initial coordinate frame to the coordinate frame of the ChAruCo board. Inside-out tracking may be implemented on resource-constrained headsets using one or more ChArUco boards without SLAM-based calibration.

The use of physical markers to locate virtual objects is common in augmented reality systems and markers have been used to develop a shared basis for shared multiple-headset applications in which multiple headsets are looking at static fiducials and content coordination is pre-coded and static in that the fiducial code dictates the displayed content. Their use as implemented in the disclosed augmented cameras is unconventional as existing applications do not perceive and communicate objects dynamically in the shared basis frame.

In one embodiment one ChaRuCo is positioned in each augmented camera field of view and analyzed to establish a coordinate frame. Both the augmented camera and the headset camera identify and calibrate their location from the ChaRuCo or other fiducial marker(s).

The augmented camera may function as an HTTP network server that exposes a REST API (an application program interface that uses HTTP requests to GET, PUT, POST and DELETE data). "application program interface" refers to instructions implementing entry points and return values to a module. "module" refers to computer code having defined entry and exit points. Examples of modules are any software comprising an application program interface, such as drivers, libraries, functions, and subroutines. This REST API includes endpoints that describe the objects detected by the augmented camera. Headsets poll these endpoints to get real-time object data. The objects comprise an oriented bounding rectangular prism, with a center point x, y, dimensions x/y/z, and orientation/rotation (theta). These coordinates are given in the ChArUco basis frame.

Operators are sensitive to latency between the time when they move an object and the time that the augmentation or depiction of that object updates in the headset display. Websockets, UDP, or another over-the-wire connection technique may be utilized instead of a REST API to reduce latency. Herein the term "augmentations" should be understood broadly to mean any depiction of information on the headset (or other client). This can include information or graphics augmenting the depiction of a physical or virtual device but may also include depictions that relate objects or provide general cues regarding the procedure to carry out such as information concerning operating equipment, handling materials, and so on.

Once the headset receives the object description it applies its extrinsic calibration (relative to the ChArUco basis frame) to re-project the object into the operator's field of view.

FIG. 1 depicts an embodiment of a work environment 120. An operator 112 (there may be more than one) wearing an augmented reality headset 114 interacts with physical objects and/or virtual objects in the augmented reality environment 102 according to a computer-aided procedure. In this example the operator 112 interacts with a physical object 118 on a lab bench or other structure. The physical object 118 may be depicted in the augmented reality environment 102 along with or replaced by an augmentation 106. The augmentation 106 may represent the entire physical object 118 and/or may depict augmenting information such as controls, settings, instructions, and so on for interacting with the physical object (e.g., arrows, attention cues, look here cues, cues showing two or more objects are associated, cues warning of unsafe condition or imminent errors). The computer-aided procedure may provide open- or closed-loop operator guidance 120. Virtual objects and/or sounds may also be projected into the augmented reality environment 102.

An augmented camera 116 is directed to capture images or video of the physical workspace 122 of the work environment 120 from its visual field (field-of-view). The augmented camera 116 may be one or more fixed position cameras, or one or more moveable cameras, or a combination of fixed position cameras and moveable cameras. Superimposing logic 104 (which may be implemented in one or more of the augmented camera 116, augmented reality headset 114, or an auxiliary computing system) transforms the images or video 108 into a depiction in the augmented reality environment 102.

By way of example, the augmented reality environment 102 may depict the physical object 118 augmented with virtual content or may depict both the physical object 118 and the augmentation 106 as a combined virtualized depiction.

Figure 2:
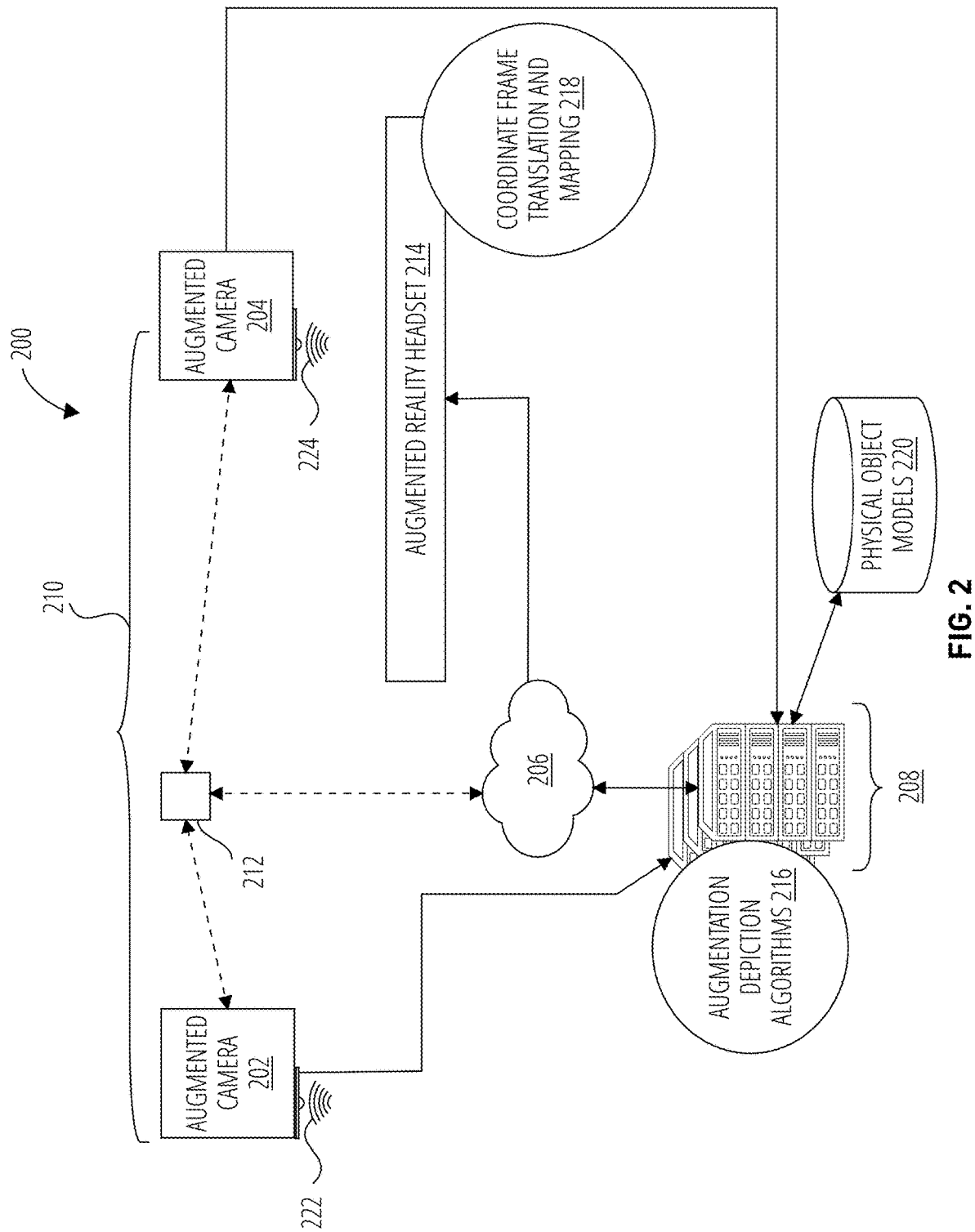
FIG. 2 depicts an augmented camera system 200 in accordance with one embodiment.

FIG. 2 depicts an augmented camera system 200 in one embodiment. The augmented camera system 200 comprises Internet of Things ("IoT") devices, in this case, augmented camera 202 with depth sensor 222 and augmented camera 204 with depth sensor 224, communicatively coupled via a wide area network 206 to a server system 208 comprising augmentation depiction algorithms 216 based at least in part on physical object models 220. The server system 208, in turn, communicates with an augmented reality headset 214 that comprises coordinate frame translation and mapping 218 logic. In some embodiments, for example, advanced headset embodiments, the augmented cameras may communicate directly with the augmented reality headset 214.

Information about the geometry and/or dimensions of objects in the workplace may be stored in the physical object models 220 database and may be utilized to determine a fiducial marker in the workplace. Depth map information from one or more of the depth sensor 222 and depth sensor 224 (or more, if there are more augmented cameras) may be utilized along with information about objects from the physical object models 220 database to identify objects, their position, size, and/or orientation in frames captured by the augmented cameras.

A number of topology variations may be implemented for the augmented camera system 200. One topology comprises a number of client devices (e.g., multiple headsets) and a "smart" server communicating with one camera. Other topologies include:

One or more augmented reality clients and one server communicating with multiple cameras (either fixed or mounted on augmented reality clients). The server performs a majority of the heavy scene processing (a "smart" server);

One or more augmented reality clients and multiple smart servers each servicing the feed from a single camera (either fixed or mounted on an augmented reality client);

One or more augmented reality clients and multiple "dumb" (the bulk of scene processing performed by other devices) servers each coupled with one or more cameras (either fixed or mounted on an augmented reality client), where each dumb server operates as a cache server for the camera feeds, and a single smart server with or without an associated camera processes the cached camera feeds.

One or more "smart" augmented reality clients and multiple augmented reality clients, where each smart augmented reality client is acting as both a mobile augmented camera, and as an augmented reality client.

The augmented reality clients may be spatially unaware (e.g., utilizing outside-in tracking), or spatially aware (e.g., utilizing inside-out tracking), and may be standard clients (on-board computation and/or rendering resources), or thin clients (external computation and/or rendering resources). A global state may be maintained between workspaces collaboratively using a peer-to-peer scheme or may be implemented by assigning a master server.

In the depicted embodiment one or more of the IoT devices 210 operates as a gateway device 212 providing a communication channel to the server system 208. The IoT devices that are not the gateway device 212 communicate directly with the gateway device 212, or via the augmented reality headset 214, which communicates on their behalf and on its own behalf with the server system 208. The augmented reality headset 214 may improve the performance of the augmented camera system 200 by mirroring at least part of the state of the server system 208 and thus enabling the IoT devices 210 to communicate without creating bandwidth or incurring the latency of the wide area network 206. The server system 208 and augmented reality headset 214 may be co-located at a facility or room with the IoT devices 210 but in some embodiments may be in distributed locations such as multiple rooms of a building or campus, and/or the server system 208 may be a cloud server system).

In one embodiment an augmented reality system includes a workspace with a fiducial marker object and at least one fixed position camera oriented at a downward angle to the workspace. The fixed position camera comprising: a first field of view and a depth sensor configured to generate a depth map. Within the environment, a human operator wears at least one headset (or other mobile device such as a tablet computer) that includes a mobile camera with a second field of view. The system includes logic, which may be localized to one device or distributed among two or more of a server system, the fixed position camera, and the headset device (also called a headpiece herein) to identify the fiducial marker object in a frame of the first field of view, determine a pose of the fiducial marker object in the first field of view, apply the fiducial marker pose in the first field of view to generate a first transformation between a first coordinate system of the fiducial marker object and a second coordinate system of the fixed position camera, and apply a pose of the headset to determine a second transformation between the first coordinate system and a third coordinate system of the headset.

Herein the coordinate system of the fiducial marker may sometimes be referred to as a "common" or "shared" reference frame or coordinate system.

The augmented reality system may also include logic to identify the fiducial marker object in a frame of the second field of view, determine a pose of the fiducial marker object in the second field of view, and apply the fiducial marker pose in the second field of view to generate the second transformation.

Once a calibration frame is obtained from the (one or more) fixed position camera and the (one or more) headset devices, and used to generate the common reference frame (coordinate system), then as the mobile headset devices change pose during a procedure, inertial guidance from the mobile headset devices and/or the headset's external or internal tracking system may be utilized to quickly compute updated coordinate system transformations from the common reference frame to each mobile headset device.

Figure 3:
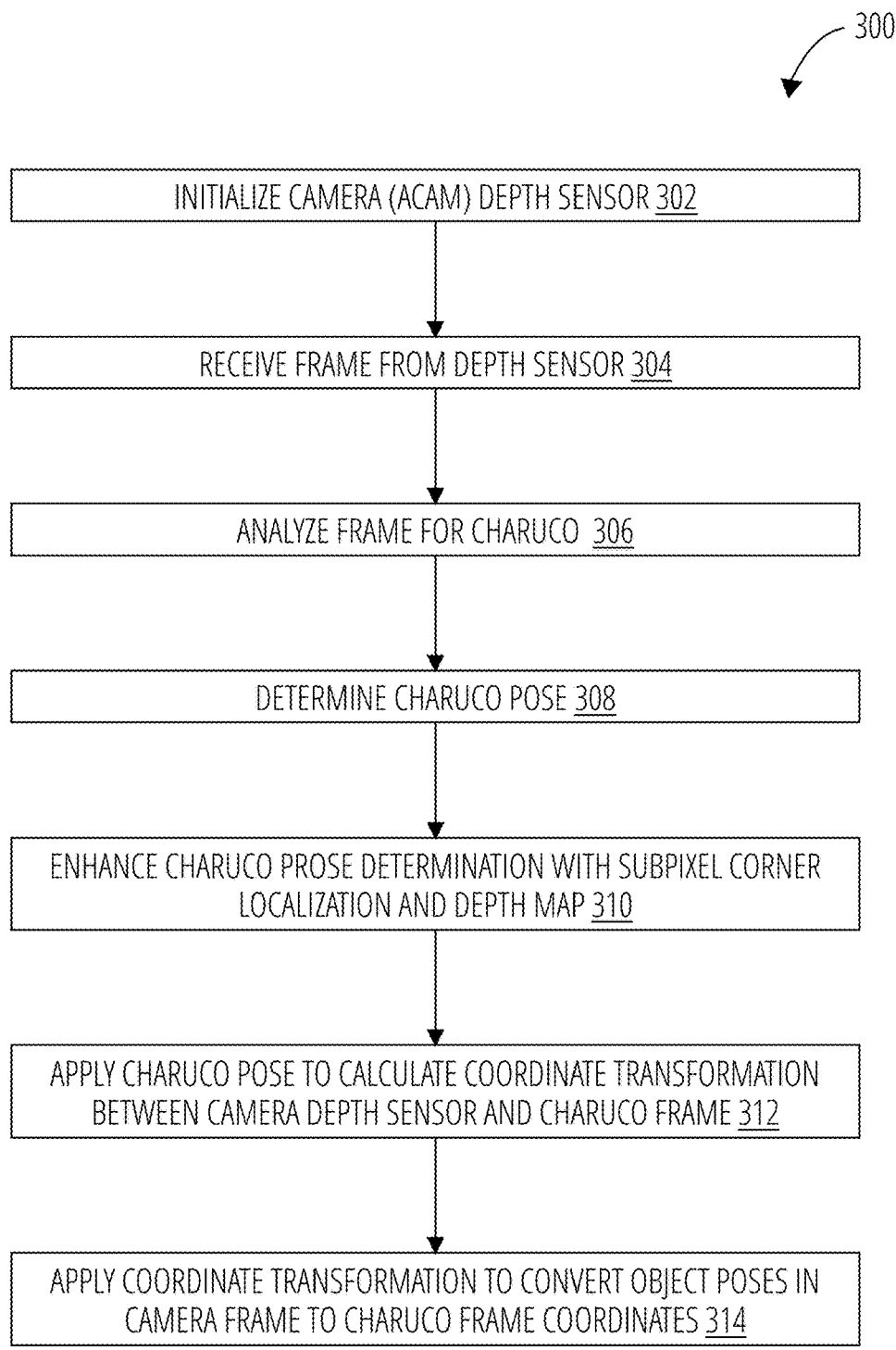
FIG. 3 depicts a shared reference frame calculation process 300 in accordance with one embodiment.

FIG. 3 depicts a shared reference frame calculation process 300 in one embodiment. The ACAM depth sensor is initialized (procedural action 302) and an image (e.g., video) frame is received from the depth sensor (procedural action 304). This frame may be in an RGB image format, for example. The frame is analyzed for a ChArUco object (procedural action 306), and if such is located in the frame, its pose (position and orientation) is determined (procedural action 308). A depth map, which may be obtained from the depth sensor of the ACAM, is applied to refine and enhance the ChArUco pose determination (procedural action 310). Subpixel corner location may also be applied to more accurately determine the ChArUco pose. Once determined, the ChArUco pose is used to calculate the coordinate transform between the ACAM depth sensor and the ChArUco frame (procedural action 312). The coordinate transform may then be utilized to transform object poses in the camera (ACAM) frame to ChArUco frame coordinates (procedural action 314).

Figure 4:
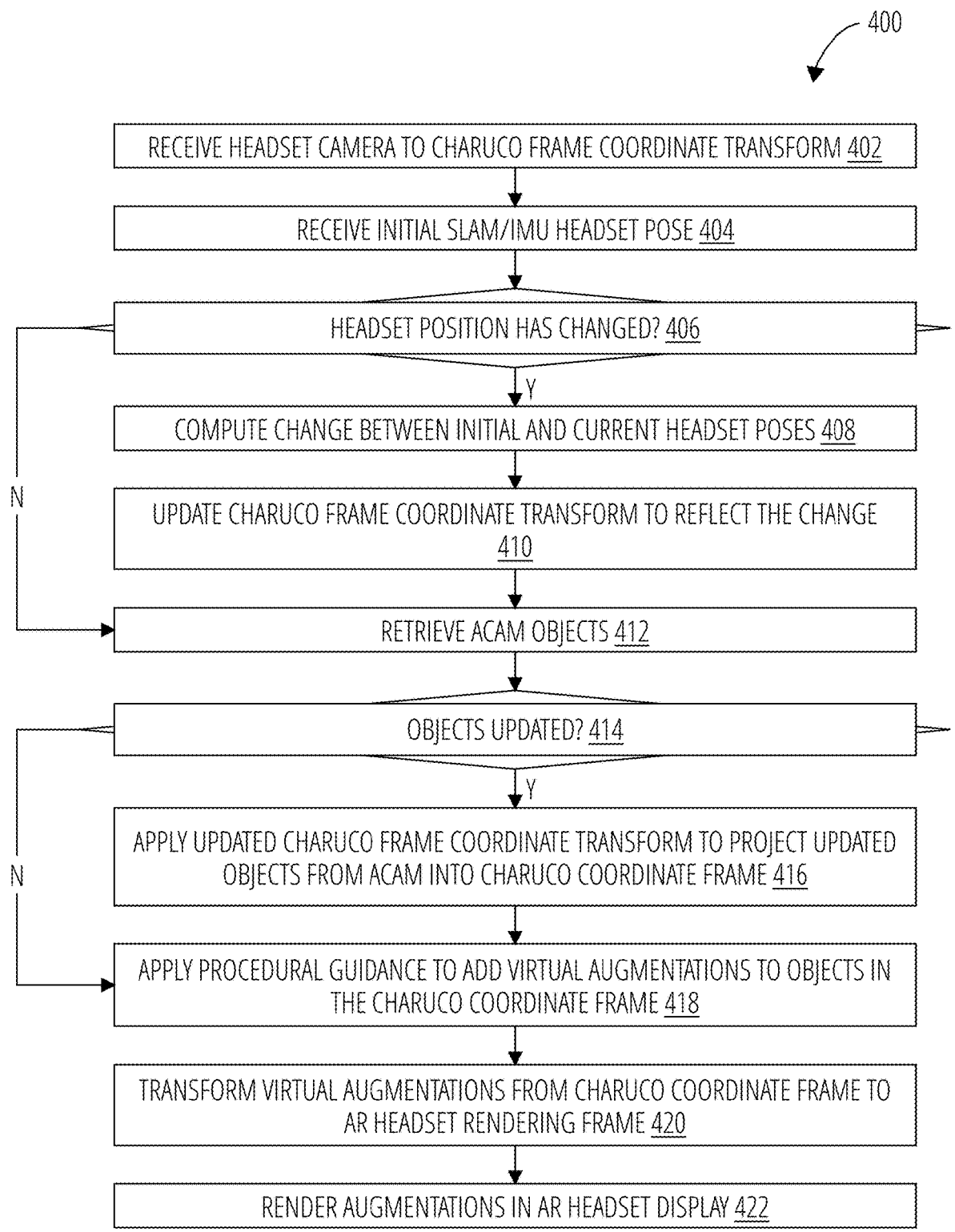
FIG. 4 depicts an object augmentation process 400 in accordance with one embodiment.

FIG. 4 depicts an object augmentation process 400 in one embodiment. Object augmentation may take place in the headset display, utilizing a headset camera to ChArUco coordinate transform (procedural action 402). The rendering of the augmentation may be affected by the pose of the headset, which can be received from the internal or external tracking system/IMU (procedural action 404). On the condition that the headset pose has changed from the last time the ChArUco frame transform was calculated (decision procedural action 406), the change in pose is determined (procedural action 408) and the ChArUco frame transform (to the headset camera frame) is updated to reflect the change in headset pose (procedural action 410).

Objects are received from the ACAM (procedural action 412). The ACAM may include logic to perform object identification in its camera frames, or this logic may reside on an external system connected to receive ACAM frames. On condition that there are new objects identified vs the last time objects from the ACAM frame were projected into the ChArUco frame (decision procedural action 414), the updated ChArUco transform is applied to update the projection of ACAM objects to the ChArUco frame (procedural action 416).

Procedural guidance is applied to form augmentations to apply to objects in the ChArUco frame (procedural action 418) and these augmentations are transformed into the headset frame (procedural action 420) and rendered in the headset (procedural action 422).

Figure 5:
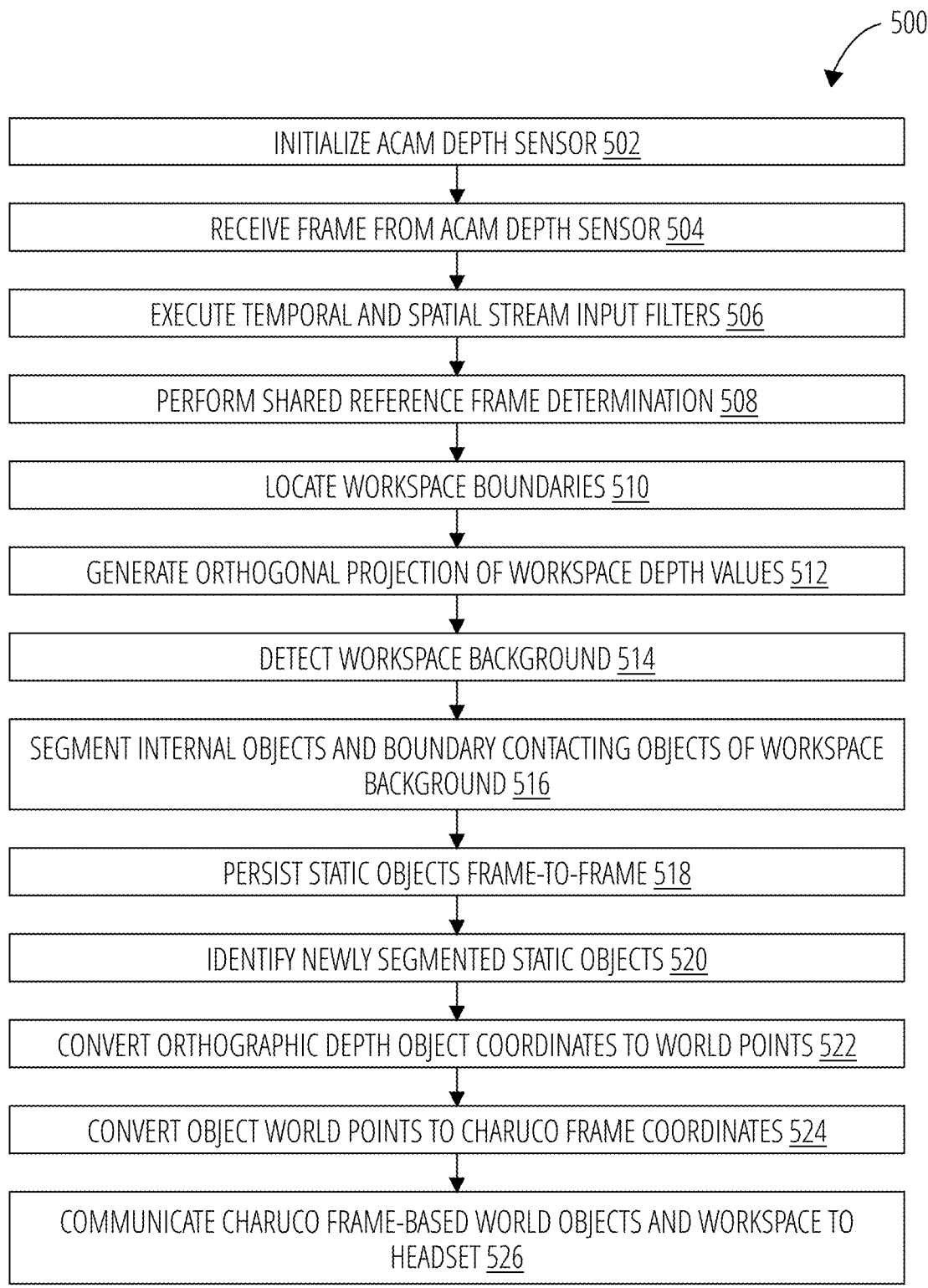
FIG. 5 depicts an object detection and tracking process 500 in accordance with one embodiment.

FIG. 5 depicts an object detection and tracking process 500 in one embodiment. The ACAM depth sensor is initialized (procedural action 502) and a frame from the ACAM is received (procedural action 504). At this point, various temporal and spatial filters may be applied to the frame to condition it for object detection (procedural action 506).

A shared (common) reference frame determination is made, for example as described previously (procedural action 508) and boundaries of the workspace to analyze/carry out the procedure are determined from the frame (procedural action 510). An orthogonal projection of the workspace depth values is generated (procedural action 512) and from this, a background of the workspace objects is detected in the frame (procedural action 514). Objects (which are not part of the background) may now be identified in the frame and segmented out (procedural action 516).

Static objects that do not move (e.g., equipment) are persisted (procedural action 518), including newly segmented static objects (procedural action 520). World points are computed for the orthographic depth coordinates of the objects (procedural action 522) and these world points are transformed into ChArUco frame coordinates (procedural action 524). The transformed object coordinates are workspace coordinates that are then communicated to the headset (procedural action 526).

Figure 6:
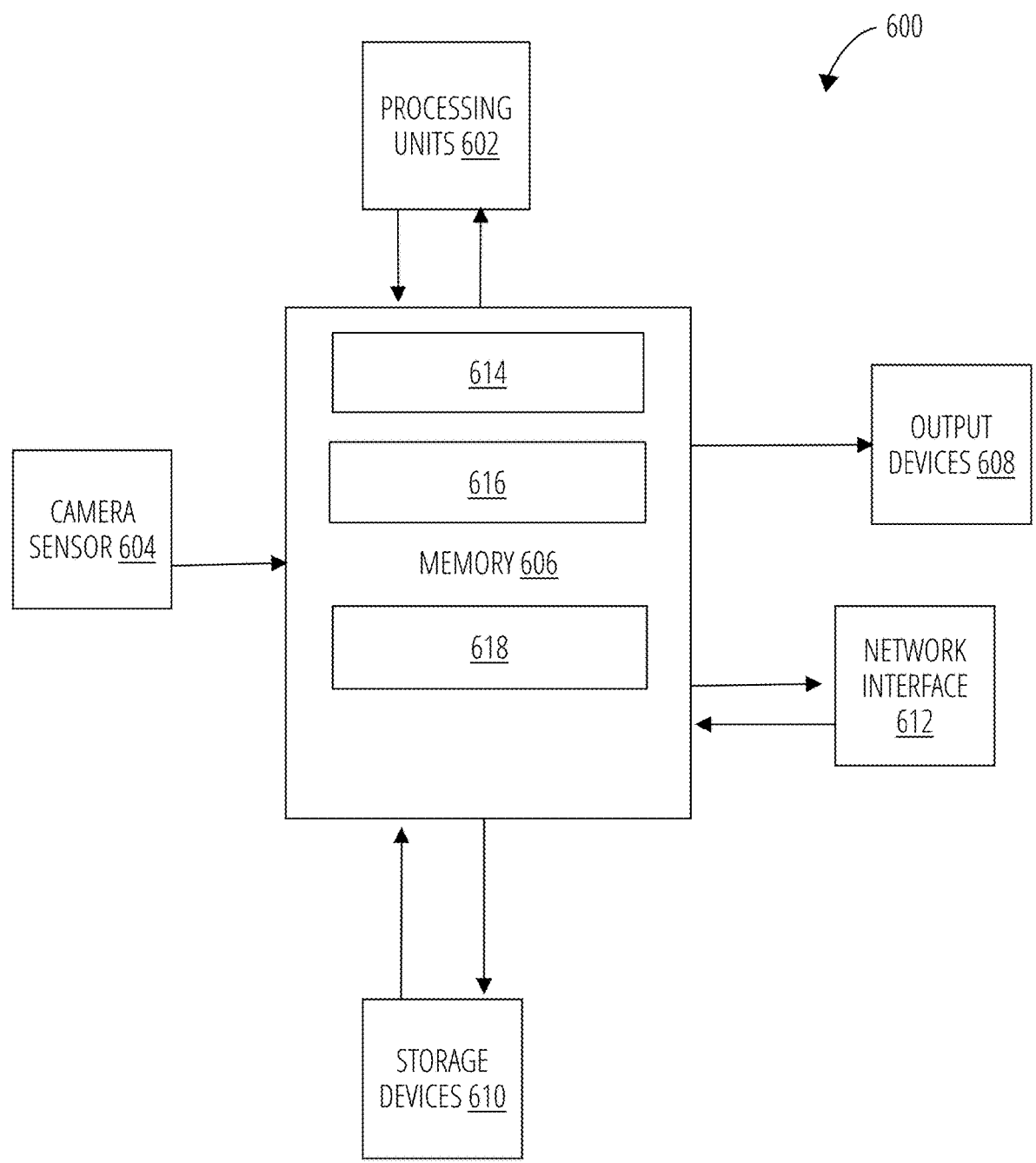
FIG. 6 depicts one embodiment of an augmented camera 600.

FIG. 6 depicts additional aspects of an augmented camera 600 according to one embodiment. It may be appreciated that there are many ways to implement cameras and camera systems and this is but one embodiment. The augmented camera 600 comprises processing units 602, camera sensor 604, memory 606, output devices 608, storage devices 610, a network interface 612, and various logic to carry out the processes disclosed herein. The various logic includes spatial localization logic 614, spatial orientation logic 616, and calibration logic 618.

The camera sensor 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of camera sensor 604 are keyboards that respond to touch or physical pressure from an object or proximity of an object to a surface, mice that respond to motion through space or across a plane, microphones that convert vibrations in the medium (typically air) into device signals, scanners which convert optical patterns on two- or three-dimensional objects into device signals. The signals from the camera sensor 604 are provided via various machine signal conductors (e.g., busses or network interfaces) and circuits to memory 606.

The memory 606 provides for storage (via configuration of matter or states of matter) of signals received from the camera sensor 604, instructions and information for controlling the operation of the processing units 602, and signals from storage devices 610. The memory 606 may comprise multiple memory devices of different types, for example, random access memory devices and non-volatile (e.g., FLASH memory) devices.

Information stored in the memory 606 is typically directly accessible to the processing units 602 of the device. Signals input to the augmented camera 600 cause the reconfiguration of the internal material/energy state of the memory 606, creating logic that in essence forms a new machine configuration, influencing the behavior of the augmented camera 600 by affecting the behavior of the processing units 602 with control signals (instructions) and data provided in conjunction with the control signals.

The storage devices 610 may provide a slower but higher capacity machine memory capability. Examples of storage devices 610 are hard disks, optical disks, flash memories or other non-volatile memory technologies, and magnetic memories.

The processing units 602 may cause the configuration of the memory 606 to be altered by signals in the storage devices 610. In other words, the processing units 602 may cause data and instructions to be read from storage devices 610 in the memory 606 from which may then influence the operations of processing units 602 as instructions and data signals, and from which it may also be provided to the output devices 608. The processing units 602 may alter the content of the memory 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile.

Output devices 608 are transducers that convert signals received from the memory 606 into physical phenomena such as vibrations in the air, or patterns of light on a machine display, or vibrations (i.e., haptic devices) or patterns of ink or other materials (i.e., printers and 3-D printers). Depending on the implementation, the augmented camera 600 may include any combination of well-known output devices 608, or none of them.

The network interface 612 receives signals from the memory 606 or processing units 602 and converts them into electrical, optical, or wireless signals to other machines, typically via a machine network. The network interface 612 also receives signals from the machine network and converts them into electrical, optical, or wireless signals to the memory 606 or processing units 602.

Figure 7:
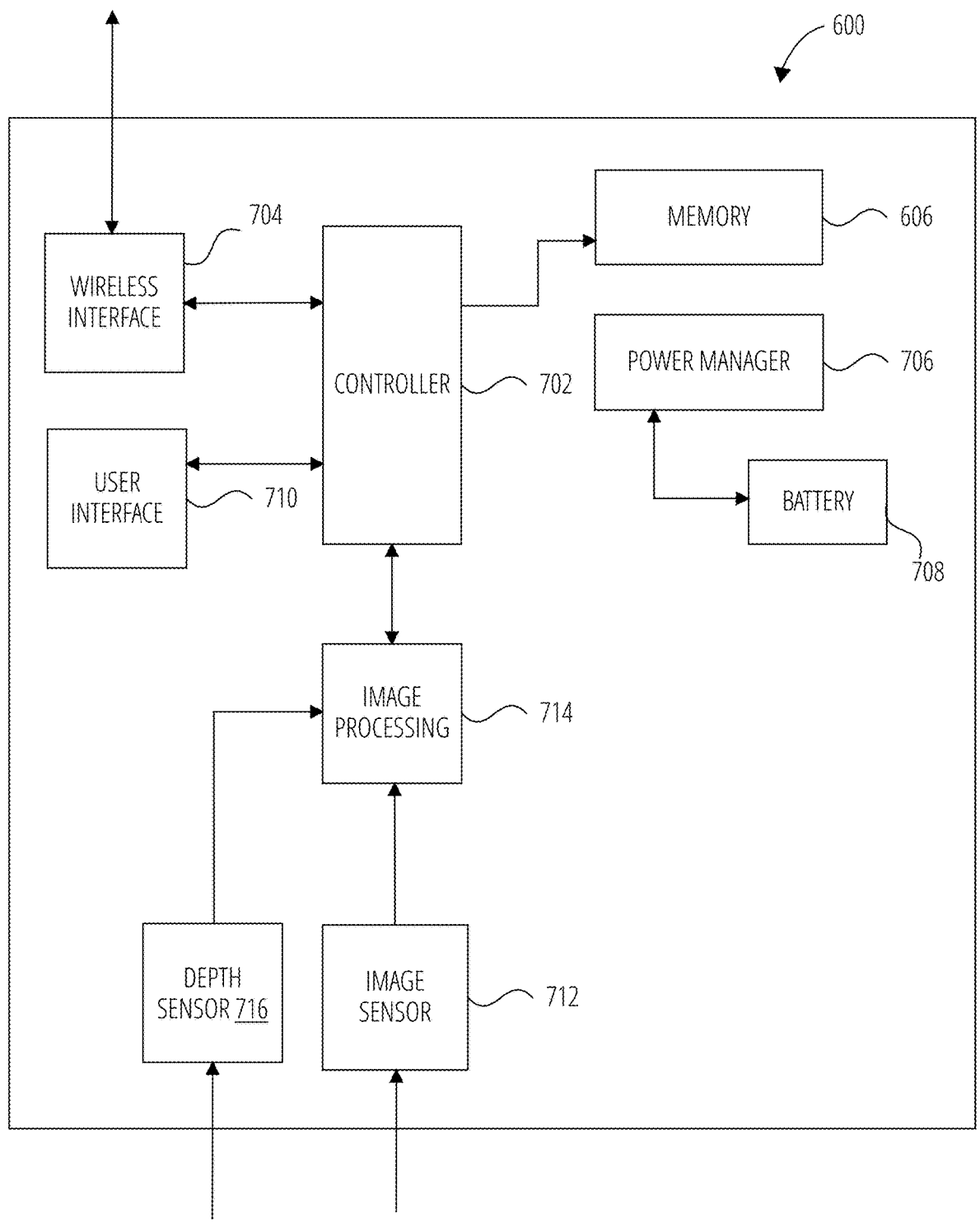
FIG. 7 depicts additional aspects of an augmented camera 600 in one embodiment.

FIG. 7 depicts additional aspects of an augmented camera 600 in one embodiment. The augmented camera 600 comprises a signal processing and system control 702 that controls and coordinates the operation of other components as well as providing signal processing for the augmented camera 600. For example, in addition to execution spatial localization and spatial orientation algorithms and described herein, the signal processing and system control 702 may extract baseband signals from radio frequency signals received from the wireless interface 704 logic and processes baseband signals up to radio frequency signals for communications transmitted to the wireless interface 704. In various embodiments, the signal processing and system control 702 may comprise a central processing unit, digital signal processor, graphics processing unit, and/or one or more controllers or combinations of these components.

The wireless interface 704 may further comprise memory 606 which may be utilized by the signal processing and system control 702 to read and write instructions (commands) and data (operands for the instructions), for example, to execute spatial orientation and spatial localization of objects identified in video or still frames captured via the image sensor 712. For high-performance applications, the augmented camera 600 may comprise special-purpose hardware (e.g., and FPGA or ASIC) to perform image processing logic 714, or these functions may be implemented as instructions in the memory 606 for execution by the signal processing and system control 702.

Communication with the human operator is needed for open-loop procedural guidance, and receipt of input from the operator is often necessary for closed-loop procedural guidance. A human user or operator of the augmented camera 600 may utilize the user interface 710 to receive information from and input information to the augmented camera 600. Images, video and other display information, for example, optical patterns, may be output to the user interface 710, which may for example operate as a liquid crystal display or may utilize other optical output technology, or use the devices or other speakers to generate sounds in the operator's field of hearing. The user interface 710 may also operate as a user input device, being touch-sensitive where contact or close contact by a user's finger or other device handled by the user may be detected by transducers.

An area of contact or proximity to the user interface 710 may also be detected by transducers and this information may be supplied to the signal processing and system control 702 to affect the internal operation of the augmented camera 600 and to influence control and operation of its various components. User input can also come from the device's microphones, for example by voice control. The improved spatial accuracy of the device in positioning virtual and physical objects allows detection of important but visually less distinct objects such as fingertips. It thus facilitates closed-loop operator control, for example by detecting that the operator is about to turn the wrong knob or flip the wrong switch, and enabling the use of novel UIs such as virtual keyboards.

An image sensor 712 and a depth sensor 716 may interface to image processing logic 714 to record images and video from the environment and to localize detected objects in those images in space. The image processing logic 714 may operate to provide image/video enhancement, compression, object localization, and other transformations, and communicate results to the signal processing and system control 702 for further processing and storage to memory 606 or output to the wireless interface 704. Images and video stored in the memory 606 may also be read by the signal processing and system control 702 and output to the user interface 710 for display to an operator of an augmented reality headset in communication (directly or indirectly) with the augmented camera 600.

Audio signals may be provided along with video or still images via a microphone and audio circuit (not illustrated). The augmented camera 600 may operate on power received from a battery 708 or from facility power. The battery 708 capability and energy supply may be managed by a power manager 706.

The augmented camera 600 may transmit wireless signals of various types and ranges (e.g., cellular, WiFi, BlueTooth, and near field communication i.e. NFC). The augmented camera 600 may also receive these types of wireless signals. Wireless signals are transmitted and received using wireless interface 704 logic coupled to one or more antenna. The augmented camera 600 may of course also communicate using wireline communication technologies (e.g. Ethernet). Other forms of electromagnetic radiation may be used to interact between devices, such as infrared (not illustrated).

Figure 8:
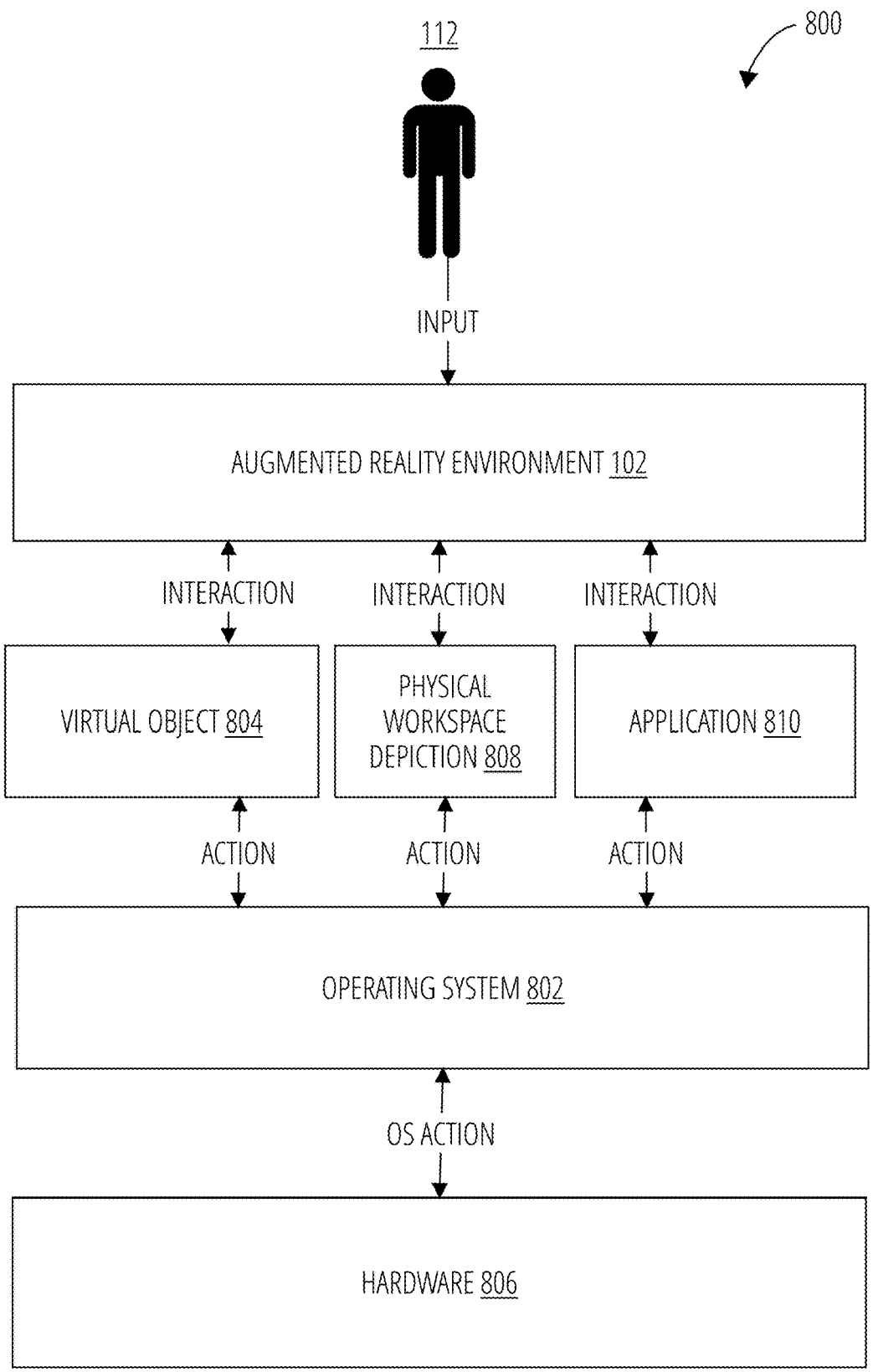
FIG. 8 depicts an augmented reality system 800 in accordance with one embodiment.

FIG. 8 depicts an augmented reality system 800 in accordance with one embodiment. The augmented reality environment 102 receives input from the operator 112 and in response sends an interaction signal to a virtual object 804 (which may be a composite of virtual information and the image of a physical object 110), a physical workspace depiction 808, or an application 810. The virtual object 804 or physical workspace depiction 808 or application 810 sends an action to an operating system 802 and in response, the operating system 802 operates the hardware 806 (e.g., an augmented reality headset) causing the software running on the headset to implement or direct the action in the augmented reality environment 102. As described, this action by the procedure or application that the software on the AR device is running can include actions that direct the operator to perform a task or induce the operator to take an action or to take particular actions based on feedback from the operator from the operator's input or actions ("closed-loop" control).

"Application" refers to any logic that is executed on a device above a level of the operating system. An application may typically be loaded by the operating system for execution and make function calls to the operating system for lower-level services. An application often has a user interface but this is not always the case. Therefore, the term 'application' includes background processes that execute at a higher level than the operating system. A particularly important kind of application that the device runs is those applications that are "protocols" or "procedures", or enable the device to "run" these. Protocols and procedures are applications providing procedural guidance, which can be open- or closed-loop, that guides the operator in the performance of particular tasks.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Software" refers to logic implemented as instructions to a programmable device or component of a device (e.g., a programmable processor, controller). Software can be source code, object code, executable code, or machine language code, for example. Unless otherwise indicated by context, software shall be understood to mean the embodiment of said code in a machine memory or hardware component, including "firmware" and micro-code.

"Source code" refers to a high-level textual computer language that undergoes either interpretation or compilation in order to be executed by a device.

"Programmable device" refers to any logic (including hardware and software logic) whose operational behavior is configurable with instructions.

"Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hardcoded into hardware (e.g., 'micro-code') and like implementations wherein the instructions are configured into a machine memory or other hardware component at manufacturing time of a device.

"Logic" refers to any set of one or more components configured to implement functionality in a machine. Logic includes machine memories configured with instructions that when executed by a machine processor cause the machine to carry out specified functionality; discrete or integrated circuits configured to carry out the specified functionality, and machine/device/computer storage media configured with instructions that when executed by a machine processor cause the machine to carry out specified functionality. Logic specifically excludes software per se, signal media, and transmission media.

Figure 9:
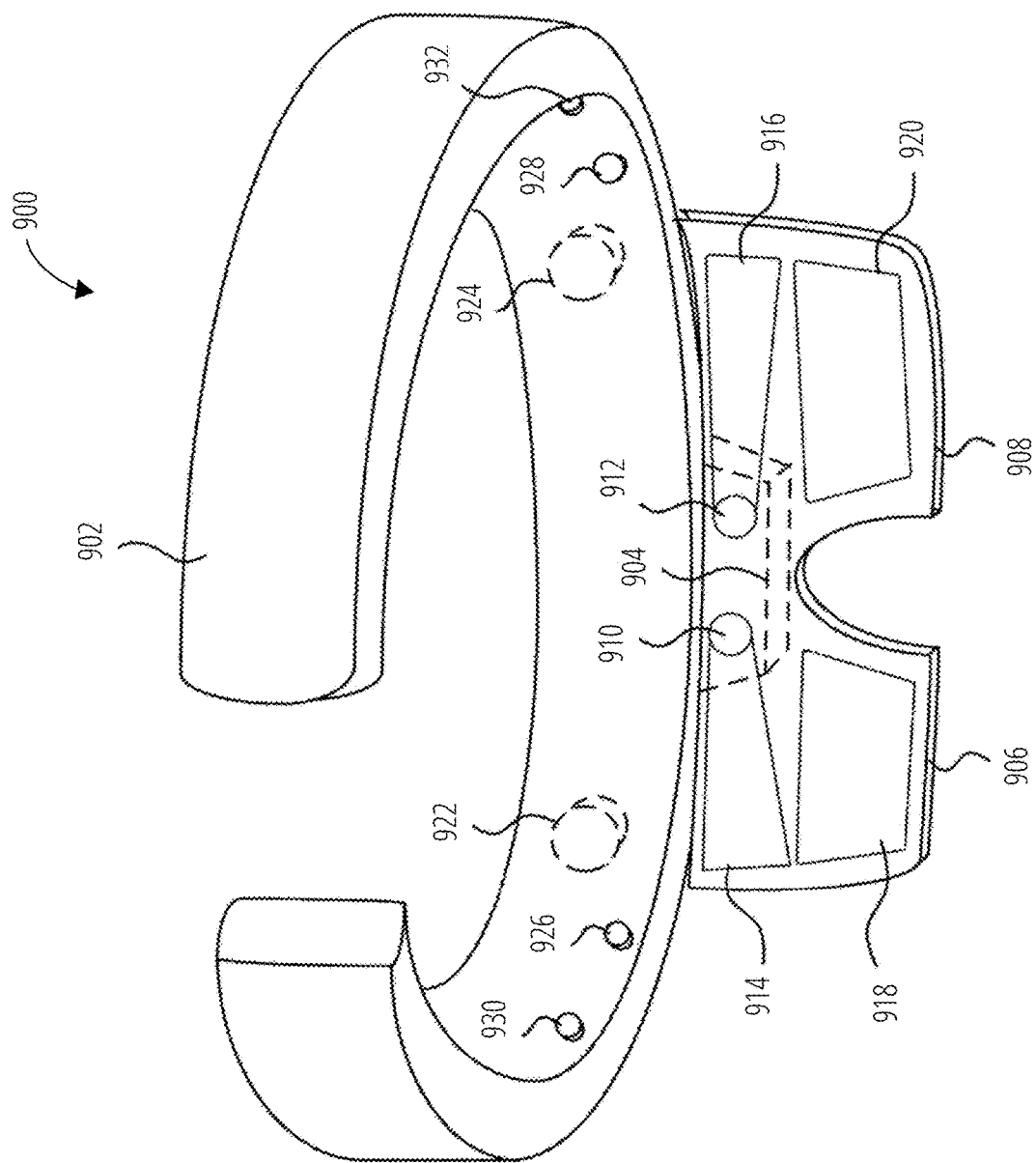
FIG. 9 depicts an augmented reality headset 900 in accordance with one embodiment.

FIG. 9 depicts a perspective view of a wearable augmented reality ("AR") augmented reality headset 900 in one embodiment. It may be appreciated that this is one example of the many extended reality headset platforms known in the art and that advances in headset technology are rapidly taking place resulting in many additional possible embodiments, including but not limited to eyeglass-like devices and contact lenses. The augmented reality headset 900 includes data processing and image display capabilities, as well as microphones enabling audio input, and speakers allowing the generation of spatially localized sounds in the user's FoH, in the form of a wearable headset. The augmented reality headset 900 comprises a headpiece 902 with a central portion 904 formed to fit over the nose bridge of a wearer and has an inner curvature intended to wrap around the wearer's head above their ears.

The headpiece 902 comprises a left optical component 906 and a right optical component 908, which are optical waveguides. For ease of reference herein each optical component may be considered to be identical apart from being mirror images of each other. Therefore description pertaining to the left-hand component also pertains to the right-hand component.

Figure 10:
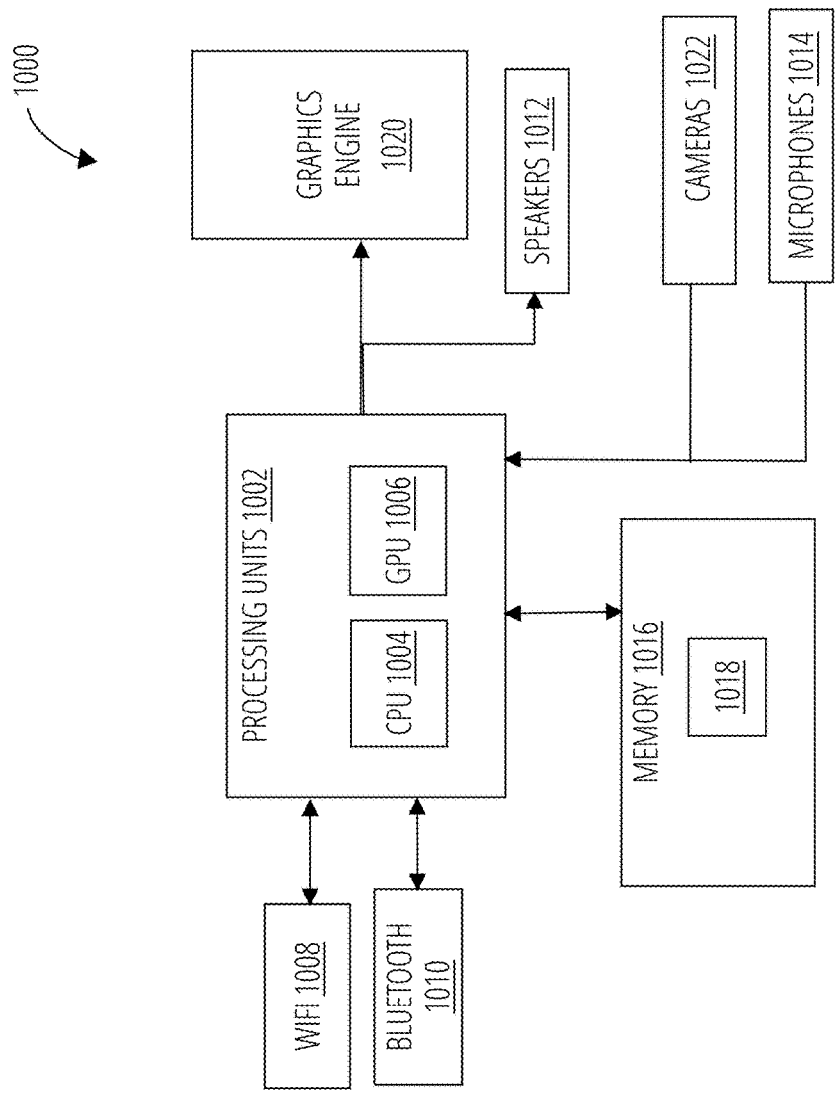
FIG. 10 depicts augmented reality headset logic 1000 in accordance with one aspect.

The augmented reality headset 900 comprises augmented reality headset logic 1000 that is depicted in FIG. 10. The augmented reality headset 900 utilizes a graphics engine 1020 that may comprise a microdisplay and imaging optics in the form of a collimating lens (not shown). The microdisplay can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of the graphics engine 1020. At the exit pupil, the collimated light beams are coupled into each of the left optical component 906 and the right optical component 908 into a respective left in-coupling zone 910 and right in-coupling zone 912. In-coupled light is then guided, through a mechanism that may involve diffraction and total internal reflection (e.g., a refractive lens nestled inside a reflector) laterally of the optical component in a respective left intermediate zone 914 and right intermediate zone 916, and also downward into a respective left exit zone 918 and right exit zone 920 where it exits towards the users' eye.

The collimating lens collimates the image into a plurality of beams, which form a virtual version of the displayed image, the virtual version being a virtual image at infinity or other distance in the visual accommodation sense. The light exits as a plurality of beams, corresponding to the input beams and forming substantially the same virtual image, which the lens of the eye projects onto the retina to form a real image visible to the user. In this manner, the left optical component 906 and the right optical component 908 project the displayed image onto the wearer's eyes.

The various optical zones may, for example, be suitably arranged diffraction gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye for example from multiple graphics engine 1020 (i.e. two microdisplays), or from the same light engine (i.e. one microdisplay) using suitable optics to split the light output from the single display.

The augmented reality headset 900 is one exemplary configuration. For instance, where two light-engines are used, these may instead be at separate locations to the right and left of the device. Moreover, while in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component 906 and the right optical component 908 though without the need for the zone structures.

Other headpiece 902 embodiments are also within the scope of the subject matter. For instance, the display optics can equally be attached to the operator's head using a frame (in the manner of conventional spectacles), helmet or other fit system, and, in future, contact lenses [,] or devices that project a direct beam onto the retina. The purpose of the fit system is to support the display and provide stability to the display and other head borne systems such as tracking systems and cameras. The fit system can be designed to meet the user population in anthropometric range and head morphology and provide comfortable support for the display system.

The augmented reality headset 900 also comprises one or more camera 1022—for example left stereo camera 922 and right stereo camera 924 mounted on the headpiece 902 and configured to capture an approximate view ("field of view") from the user's left and right eyes respectfully in this example. The cameras are located towards either side of the user's head on the headpiece 902, and thus capture images of the scene forward of the device from slightly different perspectives. In combination, the stereo cameras capture a stereoscopic moving image of the real-world environment as the device moves through it. A stereoscopic moving image comprises two moving images showing slightly different perspectives of the same scene, each formed of a temporal sequence of frames to be played out in quick succession to replicate movement. When combined, the two images give the impression of a moving 3D structure.

A left microphone 926 and a right microphone 928 are located at the front of the headpiece (from the perspective of the wearer). These and other possible additional microphones enable the localization of sounds from the operating environment. The headset also contains left and right channel speakers, earpiece or other audio output transducers the left and right of the headpiece 902. These are in the form of a pair of conventional speakers functioning as a left speaker 930 and right speaker 932 audio channel output. The headset may comprise additional speakers to enable more precisely projected sounds into the operator's FoH.

FIG. 10 depicts exemplary augmented reality headset logic 1000. The augmented reality headset logic 1000 comprises a graphics engine 1020, a camera 1022, processing units 1002, including one or more CPU 1004 (central processing unit) and/or GPU 1006 (graphics processing unit), a WiFi 1008 wireless interface, a Bluetooth 1010 wireless interface, speakers 1012, microphones 1014, and one or more memory 1016.

The processing units 1002 may in some cases comprise programmable devices such as bespoke processing units (e.g., field-programmable gate arrays, application-specific integrated circuit) designed for a particular solution, such as augmented reality related functions. The augmented reality headset logic 1000 may comprise other components that are not shown, such as dedicated depth sensors, additional interfaces etc.

Some or all of the components in FIG. 10 may be housed in an augmented reality headset. In some embodiments, some of these components may be housed in a separate housing connected or in wireless communication with the components of the augmented reality headset. For example, a separate housing for some components may be designed to be worn or a belt or to fit in the wearer's pocket, or one or more of the components may be housed in a separate computer device (smartphone, tablet, laptop or desktop computer etc.) which communicates wirelessly with the display and camera apparatus in the AR headset, whereby the headset and separate device constitute the full augmented reality headset logic 1000.

The memory 1016 comprises logic 1018 to be applied to the processing units 1002 to execute. In some cases, different parts of the logic 1018 may be executed by different components of the processing units 1002. The logic 1018 typically comprises code of an operating system, as well as code of one or more applications configured to run on the operating system to carry out aspects of the processes disclosed herein.

Figure 11:
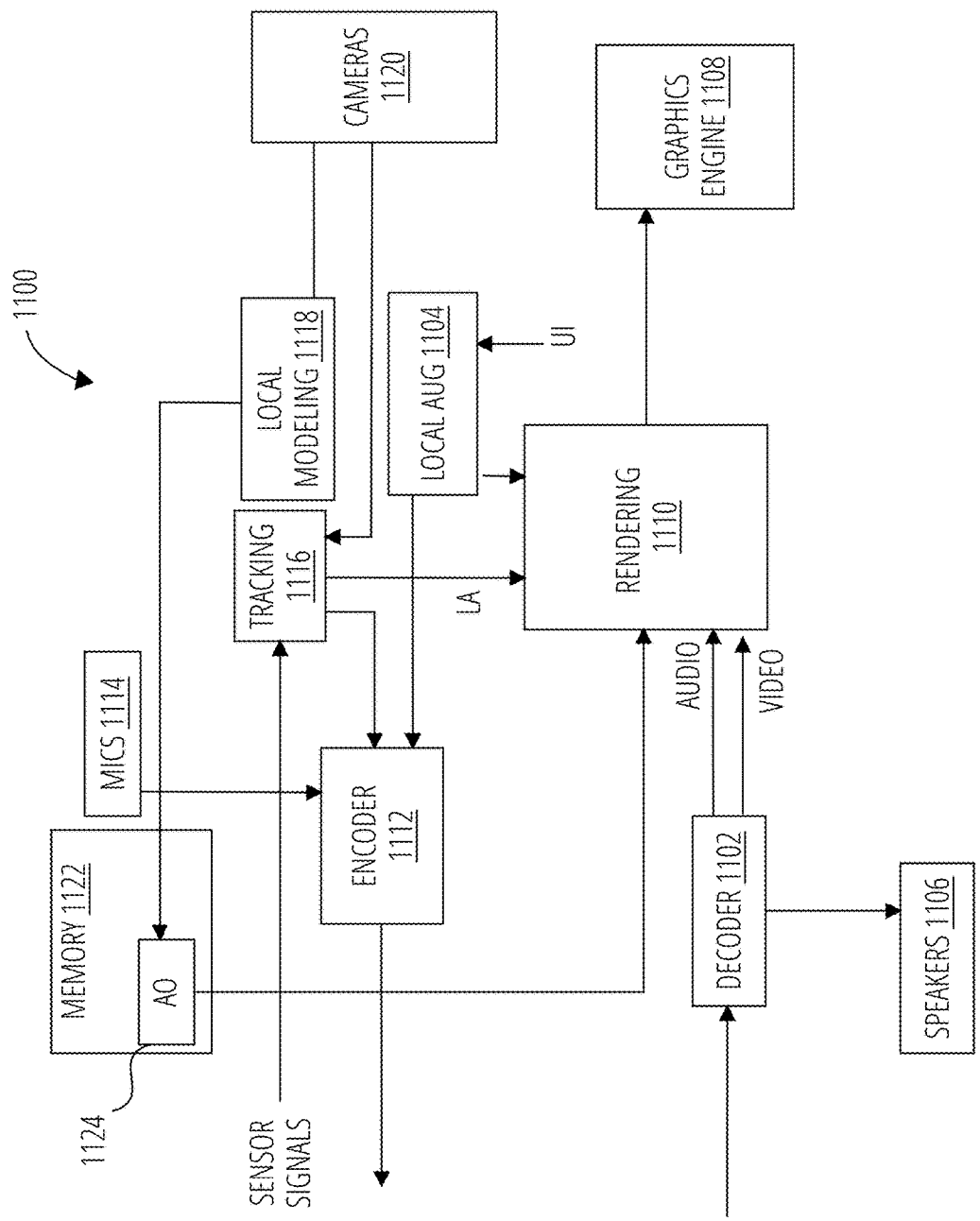
FIG. 11 depicts an augmented reality headset logic 1100 in one embodiment.

FIG. 11 depicts an embodiment of additional components of augmented reality headset logic 1100 including a rendering engine 1110, local augmentation logic 1104, local modeling logic 1118, a rendering engine 1110, device tracking logic 1116, an encoder 1112, and a decoder 1102. Each of these functional components may be implemented in software, dedicated hardware, firmware, or a combination of these logic types. These components may be distributed among one or more of an augmented camera, an augmented reality headset, and an auxiliary computing device such as a laptop, desktop, tablet, or cloud computer.

The rendering engine 1110 controls the graphics engine 1108 to generate a stereoscopic image visible to the wearer, i.e. to generate slightly different images that are projected onto different eyes by the optical components of a headset substantially simultaneously, so as to create the impression of 3D structure.

The stereoscopic image is formed by rendering engine 1110 rendering at least one virtual display element ("augmentation"), which is perceived as a 2D or 3D element at a real-world location in 3D space by the operator.

An augmentation is defined by an augmentation object 1124 stored in the memory 1122. The augmentation object 1124 comprises location data defining a desired spatial location and/or spatial orientation in 3D space for the virtual element (e.g. as (x,y,z) Cartesian coordinates). In some embodiments, the augmentation object 1124 may include additional settings such structural data defining the 3D surface structure of the virtual element, i.e. a 3D model of the virtual element, or color or texture or dynamic characteristics of the virtual element (for example, small changes in object outline, changes in brightness or color or other characteristics to direct the operator's attention); and/or operational aspects of the virtual element such as controls or instructions, or unrelated virtual objects including text, graphics, user interfaces such as virtual keyboards, enabling open loop and closed loop operator guidance.

The perceived 3D effects are achieved through suitable rendering of the augmentation object 1124 in place of or superimposed with an image of the physical object it corresponds to. To give the impression of the augmentation having a 3D structure, a stereoscopic image may be generated based on the 2D surface and 3D augmentation model data in the data object, with the augmentation being rendered to appear at the desired location in the stereoscopic image.

A 3D model of a physical object is used to give the impression of the real-world having expected tangible effects on the augmentation, in the way that it would a real-world object. The 3D model represents structure present in the real world, and the information it provides about this structure allows an augmentation to be displayed as though it were a real-world 3D object, thereby providing an immersive augmented reality experience. The 3D model may in some cases take the form of 3D mesh.

For example, based on the model of the real-world, an impression can be given of the augmentation being superimposed on a real-world object from the perspective of the operator, who may then (for example when the headset runs a procedure providing closed-loop guidance) dynamically interact with the real-world object, e.g. by manipulating the real-world object or operating it (in the case where the real-world object is a piece of equipment, for example). The operator can be directed to interact with a real-world object to learn more about it (U.S. Pat. No. 10,467,534). Augmentation and other virtual objects can change in response to operator actions (closed-loop procedural guidance)

Whether or not real-world structure should affect an augmentation can be determined based on suitable rendering criteria. In one example this could be done by creating a 3D model of the perceived real-world objects, which includes the real-world surface structure and any augmentations, and projecting it onto a plane along the operator's line of sight as determined using pose tracking (see below), or other suitable criteria for determining whether a real-world object should be perceived as being partially obscured by or obscuring an augmentation. One such criterion is whether the projection of the real-world object in the plane overlaps with the projection of the augmentation, which could be further refined to account for transparent or opaque real-world structures. Generally, the criteria can depend on the location and/or orientation of the augmented reality device and/or the real-world structure in question.

An augmentation can also be mapped to a mesh or bounding box for the real-world object, in the sense that its desired location and/or orientation is defined relative to the real-world object. Should that object move and/or rotate there will be a corresponding change in the location and/or orientation of the augmentation. For example, the desired location of an augmentation may be on, and defined relative to, a piece of equipment or material for a lab procedure. Should the object be moved, the augmentation moves with it. Object recognition can be used to this end, for example, to recognize a known shape of an object and thereby detect when the object has moved or changed orientation. Such object recognition techniques are known in the art. An augmentation that is mapped in this manner, or is otherwise associated with a particular real-world object, is referred to as an "annotation" to that object.

The local modeling logic 1118 generates the augmentation object 1124 in the memory 1122 using data received from sensor(s) e.g. cameras 1120 and/or any dedicated depth sensors etc. The local modeling logic 1118 and sensor(s) constitute sensing apparatus.

The device tracking logic 1116 tracks the location and orientation of the augmented reality headset using local sensor readings captured from sensors of the augmented reality headset (e.g., the ChArUco markers described earlier). The sensor readings can be captured in a number of ways, for example using the cameras 1120 and/or other sensor(s) such as accelerometers. The device tracking logic 1116 determines the current location and orientation of the augmented reality headset relative to the spatial location and spatial orientation of the real-world object and provides this information to the rendering engine 1110, for example by outputting a current "pose vector". The pose vector is a six-dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine 1110 adapts the local model based on the tracking, to account for the movement of the device i.e. to maintain the perception of the as 3D elements occupying the real-world, for example, to ensure that static augmentations appear to remain static (which may be achieved by scaling or rotating them as, from the operator's perspective, the environment is moving relative to them).

The encoder 1112 receives image data from the cameras 1120 and audio data from the microphones 1114 and possibly other types of data (e.g., annotation or text generated by the user of the AR device using the local augmentation logic 1104) and transmits that information to other devices, for example, the devices of collaborators in the augmented reality environment. The decoder 1102 receives an incoming data stream from other devices and extracts audio and video for the rendering engine 1110, audio for the speakers 1106, and possibly other types of data (e.g., annotations, text from a procedural work system) therefrom for including in the augmentation object 1124. The annotations, text, etc. need not be associated with a specific physical object in the workspace. Likewise, the augmentation object 1124 need not augment the depiction of an actual physical object (it could augment a virtual object, for example) or it may augment information about the depicted workspace or the process to be carried out therein.

There are two general ways of tracking an augmented reality headset (or virtual reality headset): outside-in tracking and inside-out tracking. Outside-in tracking uses fixed, wall-mounted trackers that observe active or passive fiducials on the headset to track its pose and orientation. Outside-in tracking is fast, accurate, and inexpensive, but involves the trackers and tracking volume to be set up before use and limits the user to that fixed tracking volume. Inside-out tracking does not involve fixed trackers or setup before use. In inside-out tracking, the headset simultaneously maps the environment and localizes itself in the environment. Inside-out tracking is known in the art as Simultaneous Localization and Mapping, or "SLAM."

In one implementation the headset comprises an on-board rendering engine and inside-out tracking (the HoloLens or HoloLens 2), however, resource-constrained headsets may also benefit from the disclosed mechanisms such as headsets with limited on-board processing power and/or headsets with outside-in tracking.

The systems disclosed herein, or particular components thereof, may in some embodiments be implemented as software comprising instructions executed on one or more programmable devices. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network (e.g., a cloud service platform). However, the system need not necessarily be accessed over a network and could, in some embodiments, be implemented by one or more applications on a single device or distributed between a mobile device and a computer, for example.

Figure 12:
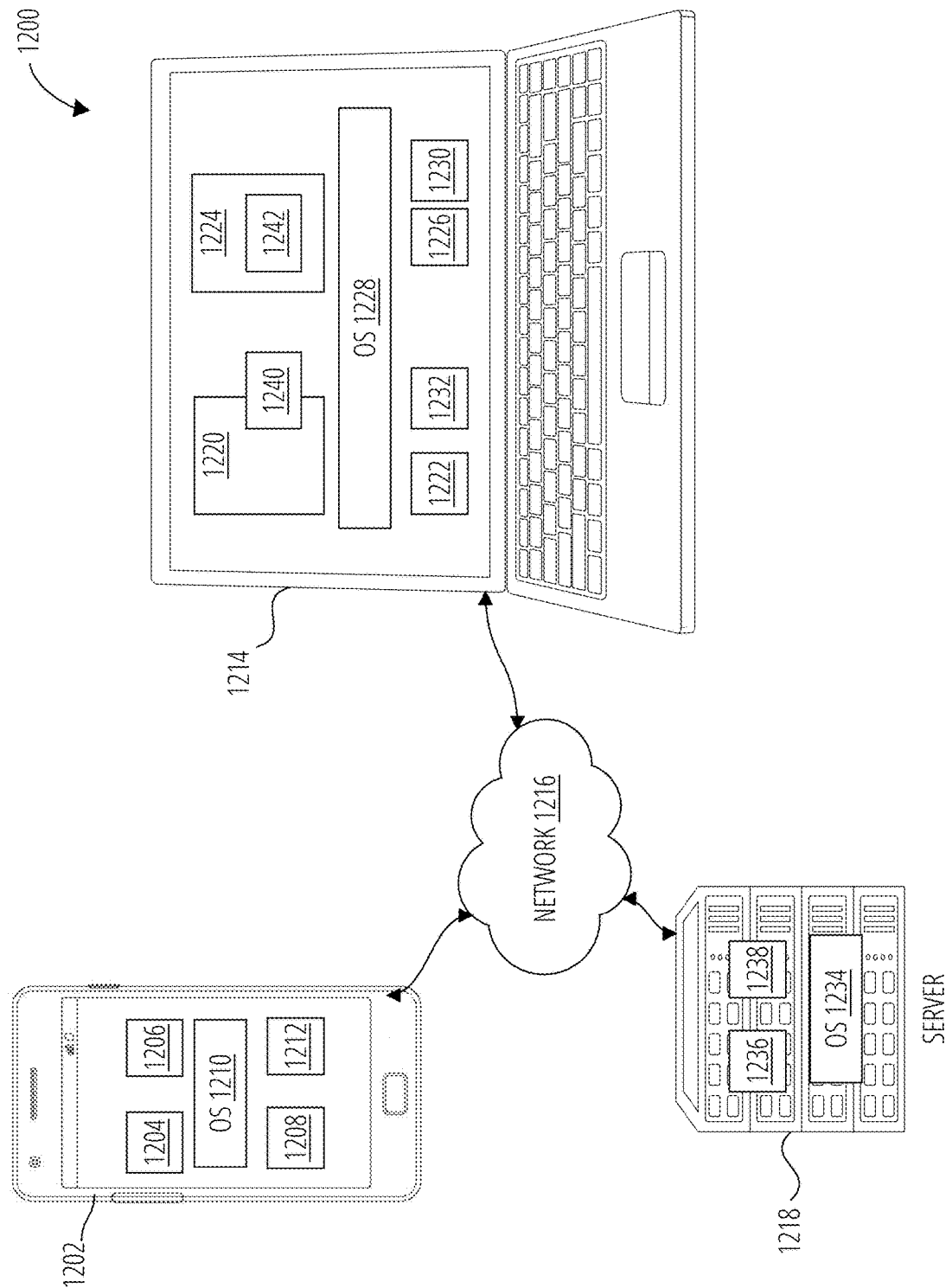
FIG. 12 illustrates a client server network configuration 1200 in accordance with one embodiment.

Referring to FIG. 12, a client-server network configuration 1200 illustrates various computer hardware devices and software modules coupled by a network 1216 in one embodiment. Each device includes a native operating system, typically pre-installed on its non-volatile RAM, and a variety of software applications or apps for performing various functions. The headset devices are not depicted, however, it should be readily understood that they may interface either via a cable, network, or wirelessly to any one or more of the mobile programmable device 1202, computer 1214, and server 1218.

The mobile programmable device 1202 comprises a native operating system 1210 and various apps (e.g., app 1204 and app 1206). A computer 1214 also includes an operating system 1228 that may include one or more libraries of native routines to run executable software on that device. The computer 1214 also includes various executable applications (e.g., application 1220 and application 1224). The mobile programmable device 1202 and computer 1214 are configured as clients on the network 1216. A server 1218 is also provided and includes an operating system 1234 with native routines specific to providing a service (e.g., service 1238 and service 1236) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 1214, mobile programmable device 1202, and/or server 1218. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1242).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1208 or driver 1212 on the mobile programmable device 1202 or computer 1214 (e.g., driver 1222 and driver 1232) might enable wireless headphones to be used for audio output(s) and a camera to be used for video inputs. Any of the devices may read and write data from and to files (e.g. file 1226 or file 1230) and applications or apps may utilize one or more plug-in (e.g., plug-in 1240) to extend their capabilities (e.g., to encode or decode video files).

The network 1216 in the client-server network configuration 1200 can be of a type understood by those skilled in the art, including a Local Area Network (LAN), Wide Area Network (WAN), Transmission Communication Protocol/Internet Protocol (TCP/IP) network, and so forth. These protocols used by the network 1216 dictate the mechanisms by which data is exchanged between devices.

Algorithm Examples

Augmented Camera—Coordinate Transformer
3Point coordinate_transformer(Sensor sensor, Transform sensor_to_ChArUco, 3Point projective_depth_point)

```
{ // This function converts a projective depth point in sensor
basis to a real depth point in ChArUco basis
// The following uses homogeneous transformation matrix mathematics
but could also be done using quaternions
// Depth frames are received from the camera as a bitmap of
projective coordinates
// Depth frame points are therefore specified as (u, v, z)
// where (u, v) are the pixel coordinates in the depth bitmap with
a top-left origin
// and z is the depth value - i.e. the detected object distance
from sensor in m
// Correct for sensor distortion
3Point undistorted_projective_depth_point =
undistort(sensor.distortion_matrix, projective_depth_point);
// Convert the point from projective to real (in the sensor-as-
origin coordinate frame)
// First get the projective values (u, v) and make a homogeneous
point so it's easy to multiply using the camera matrix
3Point homo_undistorted_projective_coord =
3Point(undistorted_projective_depth_point.x,
undistorted_projective_depth_point.x, 1)
// Take the dot product of the sensor's inverse homogeneous pinhole
camera matrix and the homogeneous coordinate
// Then scale by z
// i.e. X = u*z/f and Y = v*z/f, where X and Y are the real sensor-
basis X and Y values.
3Point homo_real_coord = projective_depth_point.z *
sensor.camera_matrix.inverse( ) * homo_undistorted_projective_coord;
3Point real_point_sensor_basis = 4Point(homo_real_coord.x,
homo_real_coord.y, project_depth_point.z);
// Rebase the real point from the sensor basis to the ChArUco basis
// Get the point in projective values so that we can use it with a
homogeneous matrix transform
4Point homo_real_point_sensor_basis =
4Point(real_point_sensor_basis, 1);
// Convert it to the ChArUco basis by taking the dot product with
the sensor_to_ChArUco transform
4Point homo_real_point_ChArUco_basis = transform_sensor_to_ChArUco
* homo_real_point_sensor_basis;
// Return the real point in ChArUco-basis coordinates
return 3Point(homo_real_point_ChArUco_basis.x,
homo_real_point_ChArUco_basis.y, homo_real_point_ChArUco_basis.z);
}
```

Augmented Camera—Shared Reference Frame Generator

```
Transform reference_frame_detector(Sensor sensor)
{
// Declare variables - local scope
DepthSensor sensor = DepthSensorFactory::DetectLocalDepthSensor( );
CharucoDetector ChArUco_detector;
CharucoPoseEstimator ChArUco_ pose_estimator;
CharucoPoseEnhancer ChArUco_pose_enhancer;
// Initialize the sensor if necessary
if (!sensor.is_initialized( )) sensor.initialize( );
while (true)
{
   RGBDFrame frame = sensor.wait_for_frame( );
   // Detect whather the headset camera image contains a ChArUco
   bool ChArUco_detected = ChArUco_detector.detect(frame.image);
   if (ChArUco_detected)
   {
      // If the image contains a ChArUco, calculate its pose
      Pose pose = ChArUco_pose_estimator.calculate_pose(frame.image);
      if (pose.is_valid( ))
      {
```

-continued

```
        // If the pose is valid, enhance it using sub-pixel corner
estimation
        Pose enhanced_pose = ChArUco_pose_enhancer.enhance_pose
(pose,
frame. image);
        // Invert the pose to ge tthe sensor_to_ChArUco transform
        Transform sensor_to_ChArUco = enhanced_pose.inverse( );
        // Return the global sensor-to-ChArUco transform (homogenous
transform matrix)
        return sensor_to_ChArUco
      }
    }
  }
}
```

AR Headset—Shared Reference Frame Generator

```
[Transform, Pose] reference_frame_detector(ARHeadset headset)
{
// Declare variables
CharucoDetector ChArUco_detector;
CharucoPoseEstimator ChArUco_pose_estimator;
CharucoPoseEnhancer ChArUco_pose_enhancer;
// Initialize the headset camera if necessary
if (!headset.camera.is_initialized( )) headset.camera.initialize( );
while (true)
{
  // Wait for the next headset camera image
  RGBImage image = headset.camera.wait_for_frame( );
  // Get the current IMU Pose (or tracking or Simultaneous
Localization and Mapping ["SLAM"] system pose if available)
  // The IMU has a much higher refresh rate than the camera, so this
will correspond to the frame
  Pose imu_pose = headset.imu.get_pose( );
  // Detect whather the headset camera image contains a ChArUco
  bool ChArUco_detected = ChArUco_detector.detect(image);
  if (ChArUco_detected)
  {
    // If the image contains a ChArUco, calculate its pose
    Pose pose = ChArUco_pose_estimator.calculate_pose(image);
    if (pose.is_valid( ))
    {
      // If the pose is valid, enhance it using sub-pixel corner
estimation
      Pose enhanced_pose = hArUco_pose_enhancer.enhance_pose(pose,
image);
      // Take the inverse to get the camera-to-ChArUco transform
      Transform transform_camera_to_ChArUco = nhanced_pose.inverse(
);
      // The the dot product of this transform and the headset's
internal camera-to-display transform
      // This gives the display_to_ChArUco transform
      Transform transform_display_to_ChArUco =
headset.transform_camera_to_display * transform_camera_to_ChArUco
      // Take the inverse of this transform to get the ChArUco-to-
display transform
      Transform transform_ChArUco_to_display =
transform_display_to_ChArUco.inverse( );
      // Return the ChArUco-to-display transform (homogenous trans-
form
matrix) and the corresponding IMU (or tracking or SLAM) pose
      return [transform_ChArUco_to_display, imu_pose];
    }
  }
}
}
```

AR Headset—Object Augmentation

```
update_display_loop(ARHeadset headset, NetAddress acam_net_address,
Transform initial_ChArUco_to_display, Pose initial_imu_pose,
Procedure procedure)
{
Objects objects;
Augmentations augmentations_ChArUco, augmentations_display;
Transform ChArUco_to_display = initial_ChArUco_to_display;
Pose imu_pose = initial_imu_pose;
while(true)
{
  Pose current_imu_pose = headset.imu.get_pose( ); // IMU (or
tracking or SLAM) pose
    bool updated = false;
      if (current_imu_pose != imu_pose)
    {
      // Calculate the pose difference
      Pose pose_delta = transform_imu_pose - current_imu_pose;
      Transform update_transform = pose_delta.inverse( );
      // Update the camera to ChArUco transform
      ChArUco_to_display = update_transform *
initial_ChArUco_to_display;
    updated = true; // Transform updated
  }
  // Get a JSON listing of ACam objects over the network
  string object_json = headset.network(acam_net_address +
'/objects');
  curr_objects = parse_json(object_json);
  // Check to see if the objects have changed (coordinates will be
in ChArUco frame)
  if (curr_objects != objects)
  {
    // Augment the objects with annotations according to the
procedure
    augmentations_ChArUco = procedure.augment(objects);
    updated = true; // Objects/augmentations updated
  }
  if (updated = = true)
  { // If either the transformation or the objects have been
updated,
    // Convert the augmentations to display coordinates and display
them
    augmentations_display =
transform_augmentations(ChArUco_to_display, augmentations_ChArUco);
    // Render the augmentations in the AR headset display
    headset.display.render(augmentations_display)
  }
}
}
```

CONCLUSION

"Algorithm" refers to any set of instructions configured to cause a machine to carry out a particular function or process.

"Application" refers to any logic that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Augmented camera" refers to a camera comprising at least one depth sensor. Augmented cameras may also include onboard image and data processing logic, for example, to perform object detection in captured images or video.

"Augmented reality" refers to technology that superimposes computer-generated objects or other annotations on a user's view of the real world, thus providing a composite view.

"Coordinate system transformation" refers to the conversion of coordinates in one reference frame to corresponding coordinates in a different reference frame. For transformations between camera coordinate systems, including transformations from a camera coordinate system to an intermediate coordinate system (e.g., of a fiducial marker), the transformation is typically a linear combination of rotation and translation and scaling, although nonlinearities may appear in the transformation to account for distortion of the camera lens or light-sensing element. In a coordinate transformation, both the coefficients account for differences in position, scale, and view angle, in manners known in the art.

"Depth map" refers to a matrix, vector, or table correlating distances relative to a depth sensor with spatial points, typically pixels, in an image or video frame.

"Depth sensor" refers to a sensor that generates depth maps.

"Fiducial marker" refers to a calibration object (or objects) for a camera that is placed in a workspace. Well-known examples of fiducial markers include aruco and ChArUco boards or stencils. Any object or stencil designed to facilitate camera calibration, monocular pose estimation, and/or pose verification (e.g., as known in the art of robotics and augmented reality) and detectable via traditional computer vision methods (e.g., as performed in OpenCV) may be utilized as a fiducial marker. In some embodiments, a fiducial marker may be an object of known size and orientation in the workspace, for example, a fixed position object utilized in the procedure itself.

"Fixed position camera" refers to a camera mounted in a fixed position and orientation in relation to a workspace. A fixed position camera may change position or orientation, in other words, it may not be unmovable. However, moving the fixed position camera will trigger another calibration process to determine a common reference frame for use with one or more headset devices.

"Fixed position object" refers to an object in a workspace that does not change pose during a procedure. In many procedures, machinery used in the procedure, although potentially moveable, remains in a fixed position object in the workspace during a particular procedure.

"Frame" refers to pixelated images generated by a camera (still or video).

"Moveable object" refers to an object in a workspace that may change pose during a procedure. In many procedures, materials and/or containers of materials used in the procedure are moveable objects in the workspace.

"Pose" refers to a three-dimensional spatial position and orientation of an object in a camera field of view.

"Procedural guidance" refers to inputs from a recorded procedure. Examples of procedures are laboratory procedures, educational procedures (tutorials, user manuals, etc.) and procedures for building or repair.

"Procedurally-meaningful relationship" refers to a spatial relationship that associates a procedural action with an object in a workspace. Examples of procedurally-meaningful relationships are arrows placed proximate to an object indicating a direction or angle of motion of the object or viewer, and highlighting to indicate an object should be acted on or used next in a procedure. Many other types of procedurally-meaningful relationships for virtual augmentations will be evident to those of ordinary skill in the art.

"Project", in the context of coordinate system transformations, refers to the transformation of object boundaries, corners, and other significant features from one coordinate system to another.

"Virtual augmentations" refers to a visual augmentation or sound localization rendered in association (localized visually or audibly) with an object in an augmented reality display. Virtual augmentations may take the form of annotations on or near an object. Non-limiting examples include arrows, flashing lights, and color enhancements of object features (e.g., 'warming' or 'cooling' color enhancements).

"Virtual reality" refers to the computer-generated simulation of a three-dimensional environment that can be interacted with in a seemingly real or physical way by a person using special electronic equipment, such as a headset with a display and gloves fitted with sensors.

"Virtualize" refers to representing a physical thing as a computer-generated simulation of that thing.

"Workspace" refers to a physical area in which a procedure or part of a procedure is carried out.

LISTING OF DRAWING ELEMENTS 102 augmented reality environment
104 superimposing logic
106 augmentation
108 images or video
110 physical object
112 operator
114 augmented reality headset
116 augmented camera
118 physical object
120 work environment
122 physical workspace
200 augmented camera system
202 augmented camera
204 augmented camera
206 wide area network
208 server system
210 IoT devices
212 gateway device
214 augmented reality headset
216 augmentation depiction algorithms
218 coordinate frame translation and mapping
220 physical object models
222 depth sensor
224 depth sensor
300 shared reference frame calculation process
302 procedural action
304 procedural action
306 procedural action
308 procedural action
310 procedural action
312 procedural action
314 procedural action
400 object augmentation process
402 procedural action
404 procedural action
406 decision procedural action
408 procedural action
410 procedural action
412 procedural action
414 decision procedural action
416 procedural action
418 procedural action
420 procedural action
422 procedural action
500 object detection and tracking process
502 procedural action
504 procedural action
506 procedural action
508 procedural action
510 procedural action
512 procedural action
514 procedural action
516 procedural action
518 procedural action
520 procedural action
522 procedural action
524 procedural action 526 procedural action
600 augmented camera
602 processing units
604 camera sensor
606 memory
608 output devices
610 storage devices
612 network interface
614 spatial localization logic
616 spatial orientation logic
618 calibration logic
702 signal processing and system control
704 wireless interface
706 power manager
708 battery
710 user interface
712 image sensor
714 image processing logic
716 depth sensor
800 augmented reality system
802 operating system
804 virtual object
806 hardware
808 physical workspace depiction
810 application
900 augmented reality headset
902 headpiece
904 central portion
906 left optical component
908 right optical component
910 left in-coupling zone
912 right in-coupling zone
914 left intermediate zone
916 right intermediate zone
918 left exit zone
920 right exit zone
922 left stereo camera
924 right stereo camera
926 left microphone
928 right microphone
930 left speaker
932 right speaker
1000 augmented reality headset logic
1002 processing units
1004 CPU
1006 GPU
1008 WiFi
1010 Bluetooth
1012 speakers
1014 microphones
1016 memory
1018 logic
1020 graphics engine
1022 camera
1100 augmented reality headset logic
1102 decoder
1104 local augmentation logic
1106 speakers
1108 graphics engine
1110 rendering engine
1112 encoder
1114 microphones
1116 device tracking logic
1118 local modeling logic
1120 cameras
1122 memory
1124 augmentation object
1200 client server network configuration
1202 mobile programmable device
1204 app
1206 app
1208 driver
1210 operating system
1212 driver
1214 computer
1216 network
1218 server
1220 application
1222 driver
1224 application
1226 file
1228 operating system
1230 file
1232 driver
1234 operating system
1236 service
1238 service
1240 plug-in
1242 interpreter Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, or memory storing program instructions which are executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. An augmented reality system comprising:
    a workspace comprising:
        a fiducial marker object;
        one or more fixed position objects; and
        one or more moveable objects;
    at least one camera oriented at a downward angle to the workspace, the camera comprising:
        a first field of view; and
        a depth sensor configured to generate a depth map;
    at least one headset comprising:
        a mobile camera; and
        a second field of view;
    logic to:
        identify the fiducial marker object in a frame of the first field of view;
        determine a pose of the fiducial marker object in the first field of view;
        apply the fiducial marker pose in the first field of view to generate a first transformation between a first coordinate system of the fiducial marker object and a second coordinate system of the fixed position camera; and
        apply a pose of the headset to determine a second transformation between the first coordinate system and a third coordinate system of the headset.

2. The augmented reality system of claim 1, wherein the at least one camera oriented at a downward angle comprises at least one fixed position camera.

3. The augmented reality system of claim 1, further comprising logic to:
    identify the fiducial marker object in a frame of the second field of view;
    determine a pose of the fiducial marker object in the second field of view; and
    apply the fiducial marker pose in the second field of view to generate the second transformation.

4. The augmented reality system of claim 1, further comprising logic to:
    detect objects in the frame of the first field of view; and
    apply the first transformation to project the objects into the first coordinate system.

5. The augmented reality system of claim 4, further comprising logic to:
    apply procedural guidance to generate virtual augmentations to the objects in the first coordinate frame.

6. The augmented reality system of claim 5, further comprising logic to:
    apply the second transformation to project the virtual augmentations into the third coordinate system; and
    render the virtual augmentations in the headset.

7. The augmented reality system of claim 6, further comprising logic to:
    render the virtual augmentations in a procedurally-meaningful relationship with camera images of the objects from the fixed position camera.

8. The augmented reality system of claim 1, further comprising:
    logic to apply the depth map to the determination of the fiducial marker pose.

9. A method for generating virtual augmentations in a headset, the method comprising:
    identifying a fiducial marker object in a frame of a first field of view generated by a fixed position camera;
    determining a pose of the fiducial marker object;
    applying the fiducial marker pose to generate a first transformation between a first coordinate system of the fiducial marker object and a second coordinate system of the fixed position camera; and
    applying a pose of a headset to determine a second transformation between the first coordinate system and a third coordinate system of the headset.

10. The method of claim 9, further comprising:
    detecting objects in the frame of the first field of view; and
    applying the first transformation to project the objects into the first coordinate system.

11. The method of claim 10, further comprising:
    applying procedural guidance to generate virtual augmentations to the objects in the first coordinate frame.

12. The method of claim 11, further comprising:
    applying the second transformation to project the virtual augmentations into the third coordinate system; and
    rendering the virtual augmentations in the headset.

13. The method of claim 12, further comprising:
    rendering the virtual augmentations in a procedurally-meaningful relationship with camera images of the objects from the fixed position camera.

14. The method of claim 9, further comprising:
    applying the depth map to the determination of the fiducial marker pose.

15. A non-transitory computer-readable storage medium, the computer-readable storage medium including instructions that when executed by a computer, cause the computer to:
    identify a fiducial marker object in a frame of a first field of view generated by a fixed position camera;
    determine a pose of the fiducial marker object;

apply the fiducial marker pose to generate a first transformation between a first coordinate system of the fiducial marker object and a second coordinate system of the fixed position camera; and apply a pose of a headset to determine a second transformation between the first coordinate system and a third coordinate system of the headset.

16. The computer-readable storage medium of claim 15, wherein the instructions further configure the computer to:

detect objects in the frame of the first field of view; and apply the first transformation to project the objects into the first coordinate system.

17. The computer-readable storage medium of claim 16, wherein the instructions further configure the computer to:

apply procedural guidance to generate virtual augmentations to the objects in the first coordinate frame.

18. The computer-readable storage medium of claim 17, wherein the instructions further configure the computer to:

apply the second transformation to project the virtual augmentations into the third coordinate system; and render the virtual augmentations in the headset.

19. The computer-readable storage medium of claim 18, wherein the instructions further configure the computer to:

render the virtual augmentations in a procedurally-meaningful relationship with camera images of the objects from the fixed position camera.

20. The computer-readable storage medium of claim 15, wherein the instructions further configure the computer to:

apply the depth map to the determination of the fiducial marker pose.

* * * * *